United States Patent
Mikawa et al.

(10) Patent No.: US 9,952,486 B2
(45) Date of Patent: Apr. 24, 2018

(54) HIGH RESOLUTION IMAGE PROJECTION APPARATUS WITH HORIZONTALLY ACTUATED IMAGE GENERATION UNIT

(71) Applicants: Akihisa Mikawa, Kanagawa (JP); Tetsuya Fujioka, Kanagawa (JP); Hideo Kanai, Tokyo (JP); Yasunari Mikutsu, Tokyo (JP); Satoshi Tsuchiya, Kanagawa (JP); Takahiro Hiramatsu, Kanagawa (JP); Yukimi Nishi, Tokyo (JP); Jun Mashimo, Tokyo (JP); Yoshito Saito, Kanagawa (JP)

(72) Inventors: Akihisa Mikawa, Kanagawa (JP); Tetsuya Fujioka, Kanagawa (JP); Hideo Kanai, Tokyo (JP); Yasunari Mikutsu, Tokyo (JP); Satoshi Tsuchiya, Kanagawa (JP); Takahiro Hiramatsu, Kanagawa (JP); Yukimi Nishi, Tokyo (JP); Jun Mashimo, Tokyo (JP); Yoshito Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 14 days.

(21) Appl. No.: 15/057,245

(22) Filed: Mar. 1, 2016

(65) Prior Publication Data

US 2016/0277716 A1    Sep. 22, 2016

(30) Foreign Application Priority Data

Mar. 18, 2015    (JP) ................................ 2015-055297

(51) Int. Cl.
*G03B 21/14* (2006.01)
*G03B 21/16* (2006.01)
(Continued)

(52) U.S. Cl.
CPC ....... *G03B 21/145* (2013.01); *G02B 26/0833* (2013.01); *G03B 21/14* (2013.01);
(Continued)

(58) Field of Classification Search
CPC .. G02B 26/0833; H04N 9/3188; H04N 9/312; H04N 9/3141; H04N 9/3144;
(Continued)

(56) References Cited

U.S. PATENT DOCUMENTS

| | | | |
|---|---|---|---|
| 6,880,937 | B2 | 4/2005 | Hayashi |
| 9,004,696 | B1 | 4/2015 | Mikawa et al. |

(Continued)

FOREIGN PATENT DOCUMENTS

| | | |
|---|---|---|
| CN | 105652565 | 6/2016 |
| EP | 3026490 | 6/2016 |

(Continued)

OTHER PUBLICATIONS

Extended European Search Report dated Aug. 18, 2016.
Chinese 1st Office Action for 201610143998.X dated Jun. 27, 2017.

*Primary Examiner* — Sultan Chowdhury
*Assistant Examiner* — Magda Cruz
(74) *Attorney, Agent, or Firm* — IPUSA, PLLC

(57) ABSTRACT

There is provided a image projection apparatus including an image generation unit for generating an image by using light emitted from a light source, comprising: a movable unit configured to hold the image generation unit and to be able to change a position of the image generation unit; and a drive unit configured to drive the movable unit to move, wherein the movable unit is disposed to move horizontally.

10 Claims, 24 Drawing Sheets

(51) Int. Cl.
   *G02B 26/08*      (2006.01)
   *H04N 9/31*       (2006.01)
(52) U.S. Cl.
   CPC ............ *G03B 21/16* (2013.01); *H04N 9/312* (2013.01); *H04N 9/317* (2013.01); *H04N 9/3141* (2013.01); *H04N 9/3144* (2013.01); *H04N 9/3188* (2013.01)
(58) Field of Classification Search
   CPC ...... H04N 9/317; G03B 21/14; G03B 21/145; G03B 21/16
   See application file for complete search history.

(56) References Cited

U.S. PATENT DOCUMENTS

| | | |
|---|---|---|
| 9,100,598 B2 | 8/2015 | Kaminaga et al. |
| 2007/0008495 A1 | 1/2007 | Miyagaki et al. |
| 2013/0114052 A1 | 5/2013 | Fujioka et al. |
| 2013/0242270 A1* | 9/2013 | Tsukioka ............... G03B 21/16 353/61 |
| 2014/0192397 A1* | 7/2014 | Atnip ................. B81C 1/00642 359/291 |
| 2014/0375966 A1 | 12/2014 | Mikawa et al. |
| 2014/0375967 A1 | 12/2014 | Mikawa et al. |
| 2015/0198870 A1 | 7/2015 | Mikawa et al. |
| 2016/0154294 A1 | 6/2016 | Fujioka et al. |

FOREIGN PATENT DOCUMENTS

| | | |
|---|---|---|
| JP | 2003-248189 | 9/2003 |
| JP | 2005-084581 | 3/2005 |
| JP | 2007-248721 | 9/2007 |
| JP | 2008-070494 | 3/2008 |
| JP | 5379647 | 12/2013 |

* cited by examiner

HIGH RESOLUTION IMAGE PROJECTION APPARATUS WITH HORIZONTALLY ACTUATED IMAGE GENERATION UNIT

BACKGROUND OF THE INVENTION

1. Field of the Invention

The present invention relates to an image projection apparatus.

2. Description of the Related Art

An image projection apparatus is known in which an image generation unit generates an image based on image data received from a personal computer (PC) or a digital camera using light emitted by a light source, and the generated image is passed through an optical system including a plurality of lenses to project an image on a screen. For example, a liquid crystal display (LCD) panel or a digital micromirror device (DMD) may be used as the image generation unit.

In Patent Document 1, an image projection apparatus for obtaining a high-resolution projection image is proposed, in which two decentered lenses are provided in a projection optical system and the two decentered lenses are relatively moved in a direction orthogonal to an optical axis back-and-forth so as to shift the image on a projection surface.

The subject matter of the present application relates to an image projection apparatus for obtaining a high-resolution projection image that adopts a different method for shifting the image on the projection surface. Specifically, an image generation unit held in a movable holding unit is provided, and the image generation unit is moved back-and-forth at a predetermined cycle, thereby obtaining the high-resolution projection image. However, depending on the direction in which the movable holding unit is moved back-and-forth, the influence of gravity needs to be considered. Therefore, a complex control for driving the movable holding unit is required.

RELATED ART DOCUMENT

Patent Document

[Patent Document 1]: Japanese Unexamined Patent Application Publication No. 2005-84581

SUMMARY OF THE INVENTION

An object of disclosure of the present technology is to provide an image projection apparatus that is able to move an image generation unit with a high precision.

The following configuration is adopted to achieve the aforementioned object.

In one aspect of the embodiment, there is provided a image projection apparatus including an image generation unit for generating an image using light emitted from a light source, image projection apparatus comprising: a movable unit configured to hold the image generation unit and to be able to change a position of the image generation unit; and a drive unit configured to drive the movable unit to move, wherein the movable unit is disposed to move horizontally.

Other objects, features and advantages of the present invention will become apparent from the following detailed description when read in conjunction with the accompanying drawings.

DETAILED DESCRIPTION OF THE PREFERRED EMBODIMENTS

A description will be given of embodiments with reference to the accompanying drawings.

Figure 1:
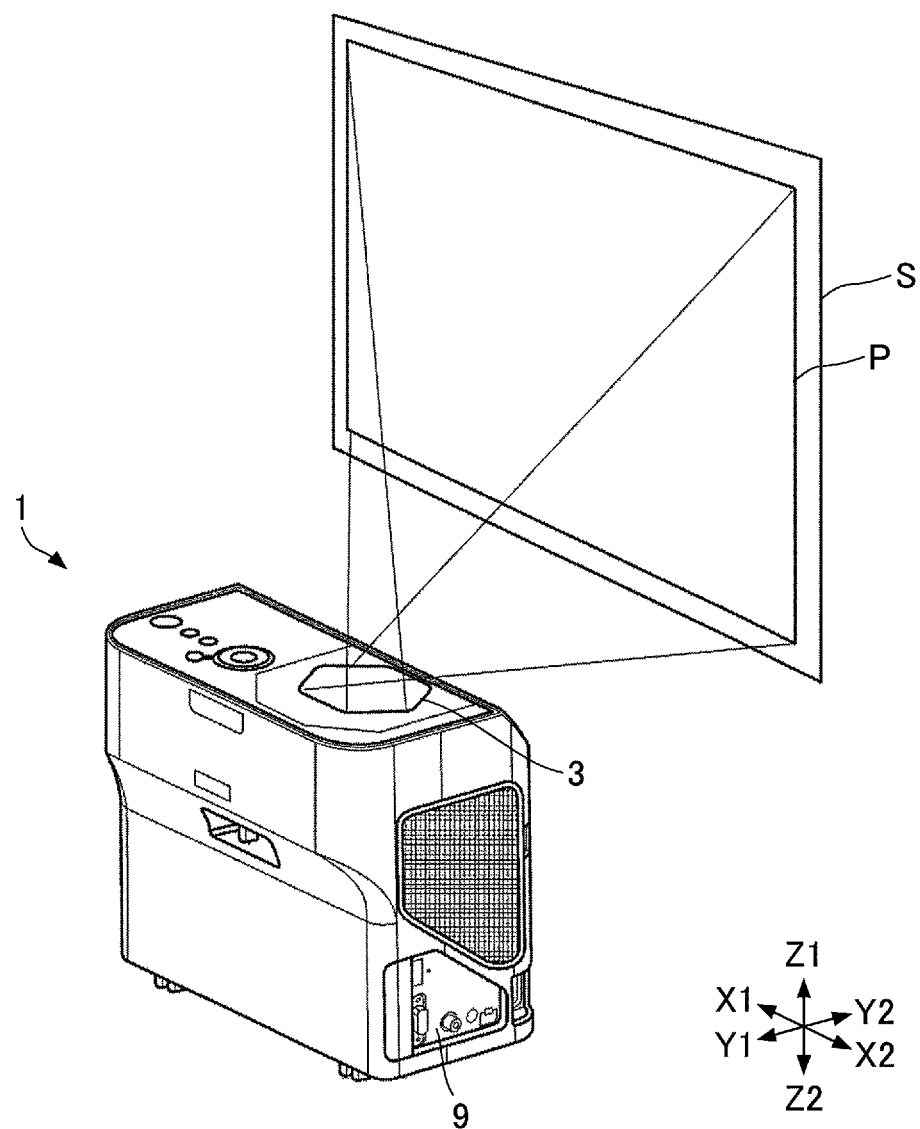
FIG. 1 is a diagram showing a projector which is an image projection apparatus according to an embodiment.

FIG. 1 is a diagram showing a projector 1 which is an image projection apparatus according to an embodiment. As shown in FIG. 1, the projector 1 includes a radiation window 3 and an external interface (I/F) 9, and an optical engine which is configured to generate a projection image is provided in the inside of the projector 1. For example, when image data is transmitted to the projector 1 from a personal computer (PC) or a digital camera connected to the external interface 9, the optical engine generates an image based on the received image data and projects the image from the radiation window 3 onto a screen S as shown in FIG. 1.

Note that, in the following drawings, X1-X2 directions represent width directions of the projector 1, Y1-Y2 directions represent height directions of the projector 1, and Z1-Z2 directions represent depth directions of the projector 1. Moreover, in the following description, it is assumed that the radiation window 3 side of the projector 1 corresponds to the top of the projector 1 and the side of the projector 1 opposite to the radiation window 3 corresponds to the bottom of the projector 1.

Figure 2:
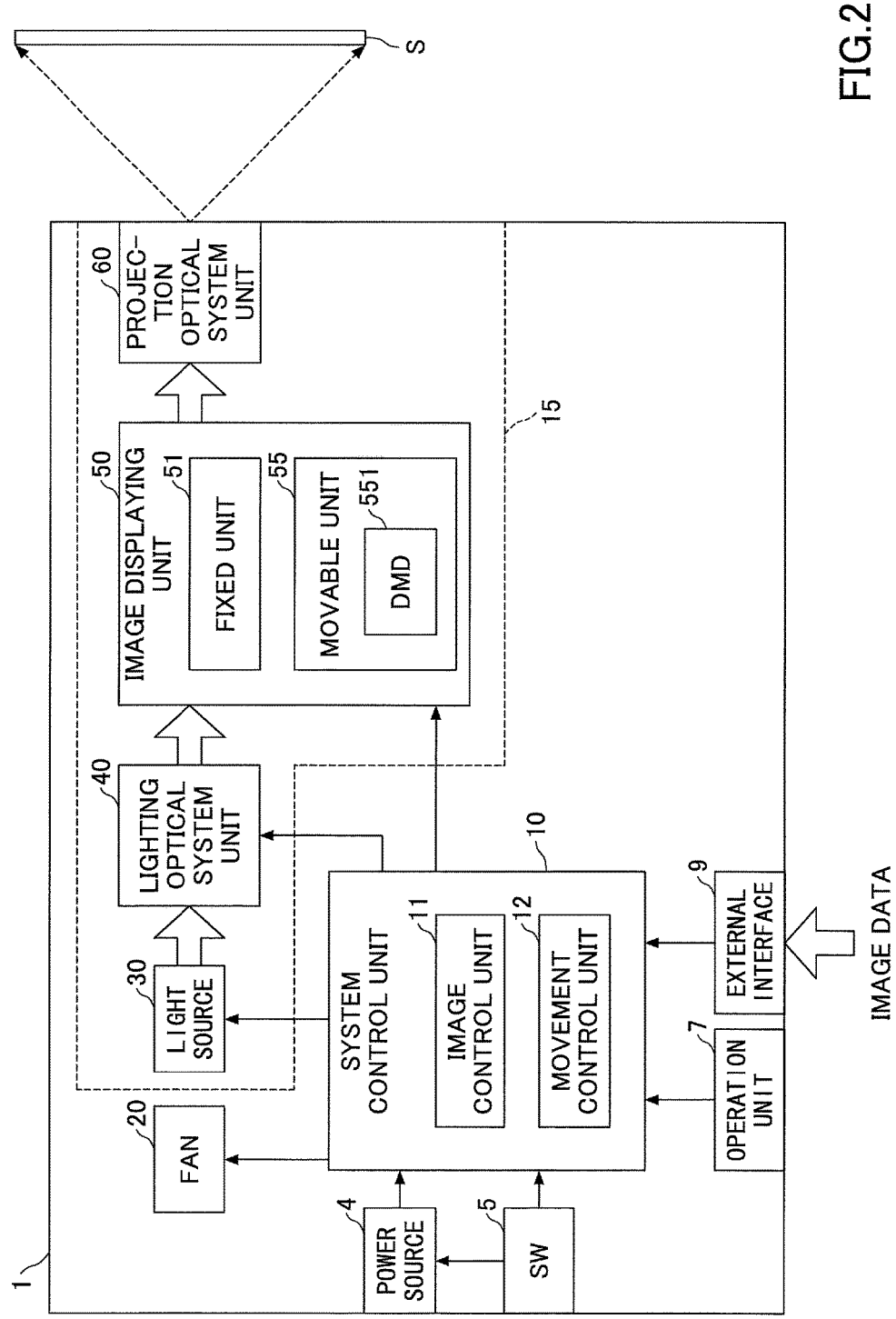
FIG. 2 is a block diagram showing a functional configuration of the projector.

FIG. 2 is a block diagram showing a functional configuration of the projector 1. As shown in FIG. 2, the projector 1 includes a power source 4, a main switch (SW) 5, an operation unit 7, an external interface (I/F) 9, a system control unit 10, a fan 20, and an optical engine 15.

The power source 4 is connected to a commercial power source, converts voltage and frequency of the commercial power for the internal circuits of the projector 1, and supplies the resulting power to each of the system control unit 10, the fan 20, and the optical engine 15.

The main switch 5 is switched ON or OFF by a user to power on or off the projector 1. While the power source 4 is connected to the commercial power source via a power cord, if the main switch 5 is switched ON, the power source 4 starts supplying power to the respective components of the projector 1, and if the main switch 5 is switched OFF, the power source 4 stops the power supply to the respective components of the projector 1.

The operation unit 7 includes buttons configured to receive various input operations by a user. For example, the operation unit 7 is provided on a top surface of the projector 1. The operation unit 7 is configured to receive input operations by the user, such as selection of a size of a projection image, selection of a color tone, and adjustment of a focus. The user's input operation received by the operation unit 7 is sent to the system control unit 10.

The external interface 9 includes connection terminals connected to, for example, a personal computer (PC) or a digital camera, and is configured to supply image data, which is received from the connected apparatus, to the system control unit 10.

The system control unit 10 includes an image control unit 11 and a movement control unit 12. For example, the system control unit 10 may include a CPU (a processor), a ROM, and a RAM as hardware components thereof. The functions of the system control unit 10 may be implemented by instructions from the CPU when a program read from the ROM into the RAM is executed by the CPU.

The image control unit 11 is configured to control a digital micromirror device (DMD) 551 provided in an image displaying unit 50 of the optical engine 15 based on the image data received from the external interface 9, to generate an image to be projected on the screen S.

The movement control unit 12 is configured to move a movable unit 55 (which is provided to be movable in the image displaying unit 50) and control a position of the DMD 551 provided in the movable unit 55. The movable unit 55 is an example of a movable member in the claims.

The fan 20 is rotated under the control of the system control unit 10 to cool a light source 30 of the optical engine 15.

The optical engine 15 includes the light source 30, a lighting optical system unit 40, the image displaying unit 50, and a projection optical system unit 60. The optical engine 15 is controlled by the system control unit 10 to project an image on a screen S as shown in FIG. 1.

Examples of the light source 30 include a mercury high-pressure lamp, a xenon lamp, and a light emitting diode (LED). The light source 30 is controlled by the system control unit 10 to emit light to the lighting optical system unit 40.

The lighting optical system unit 40 includes, for example, a color wheel, a light tunnel, and relay lenses. The lighting optical system unit 40 is configured to guide the light emitted from the light source 30 to the DMD 551 provided in the image displaying unit 50.

The image displaying unit 50 includes a fixed unit 51 which is fixed and supported on the image displaying unit 50, and the movable unit 55 which is provided to be movable relative to the fixed unit 51. The fixed unit 51 is an example of a fixed member in the claims. The movable unit 55 includes the DMD 551 and a position of the movable unit 55 relative to the fixed unit 51 is controlled by the movement control unit 12 of the system control unit 10. The DMD 551 is an example of an image generation unit in the claims. The DMD 551 is controlled by the image control unit 11 of the system control unit 10. The DMD 551 is configured to modulate the light received from the lighting optical system unit 40 and generate a projection image based on the received light.

The projection optical system unit 60 includes, for example, a plurality of projection lenses and a mirror. The projection optical system unit 60 is configured to enlarge the image generated by the DMD 551 of the image displaying unit 50, and project the enlarged image on the screen S.

Next, a configuration of the optical engine 15 of the projector 1 is explained.

Figure 3:
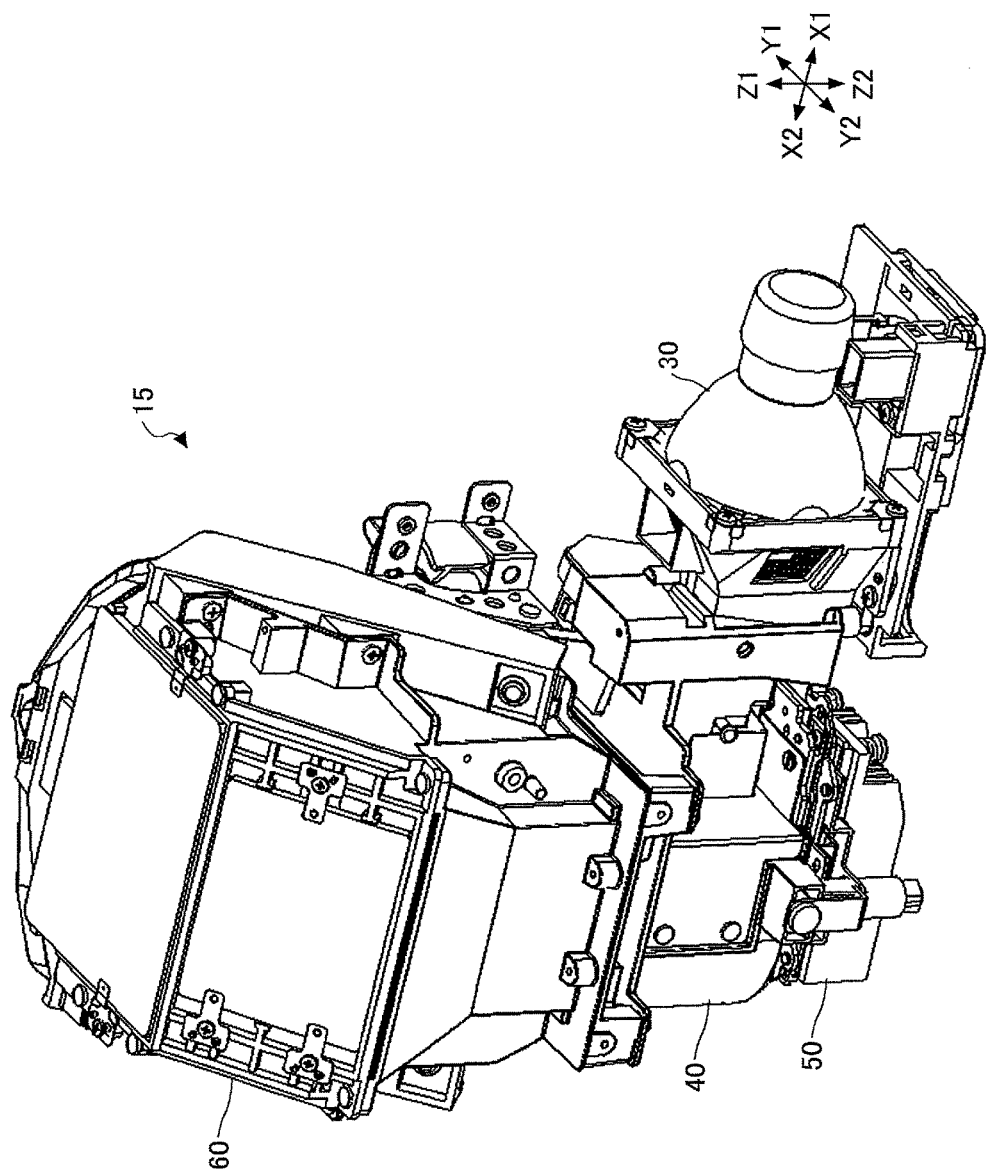
FIG. 3 is a perspective view of an optical engine of the projector.

FIG. 3 is a perspective view of the optical engine 15 of the projector 1. As shown in FIG. 3, the optical engine 15 includes the light source 30, the lighting optical system unit 40, the image displaying unit 50, and the projection optical system unit 60. The optical engine 15 is provided in the inside of the projector 1.

The light source 30 is provided on a side surface of the lighting optical system unit 40. The light source 30 is configured to emit light in the X2 direction. The lighting optical system unit 40 is configured to guide the light emitted from the light source 30 to the image displaying unit 50. The image displaying unit 50 is provided beneath the lighting optical system unit 40. The image displaying unit 50 is configured to generate a projection image based on the light received from the lighting optical system unit 40. The projection optical system unit 60 is provided above the lighting optical system unit 40. The projection optical system unit 60 is configured to project the projection image generated by the image displaying unit 50 onto the screen S which is provided outside the projector 1.

The optical engine 15 of this embodiment is configured to project the image based on the light emitted from the light source 30 in an upward direction. Alternatively, the optical engine 15 may be configured to project the image in a horizontal direction.

Figure 4:
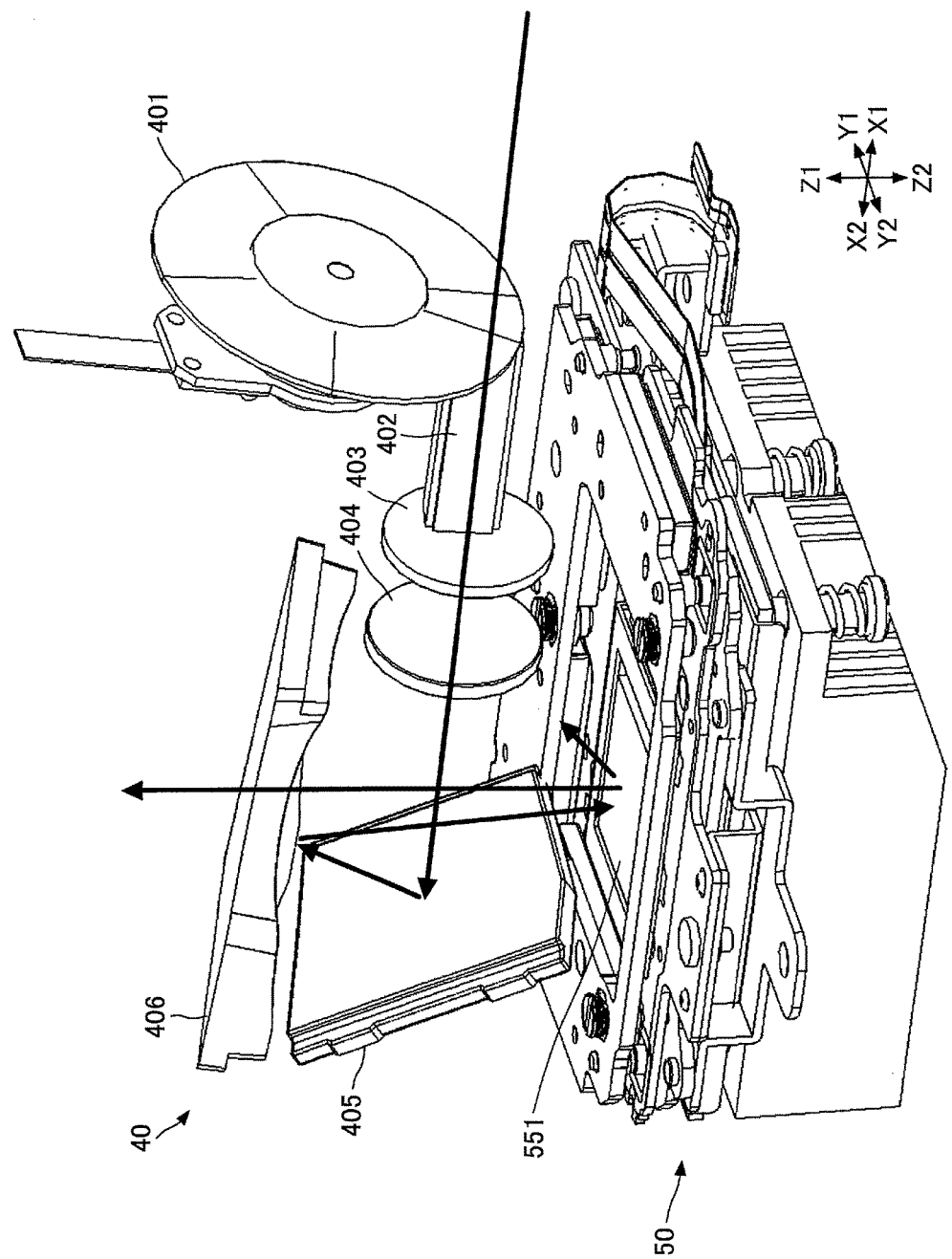
FIG. 4 is a diagram showing a lighting optical system unit.

FIG. 4 is a diagram showing the lighting optical system unit 40. As shown in FIG. 4, the lighting optical system unit 40 includes a color wheel 401, a light tunnel 402, relay lenses 403 and 404, a cylinder mirror 405, and a concave mirror 406.

The color wheel 401 is, for example, a disc-like component in which color filters of R (red), G (green), and B (blue) are provided at different portions in a circumferential direction thereof. The color wheel 401 is rotated at high speed so that the light emitted from the light source 30 is divided into RGB color light beams in a time-division manner.

The light tunnel 402 is, for example, a rectangular tube-like component formed of bonded glass sheets. The light tunnel 402 functions to perform multipath reflection of the RGB color light beams passing through the color wheel 401 by the internal surfaces thereof for equalization of luminance distribution, and guides the resulting light beams to the relay lenses 403 and 404.

The relay lenses 403 and 404 function to correct the chromatic aberrations on the optical axis of the light beams emitted from the light tunnel 402 and convert the light beams into converging light beams.

The cylinder mirror 405 and the concave mirror 406 function to reflect the light emitted from the relay lens 404 to the DMD 551 provided in the image displaying unit 50. The DMD 551 is configured to modulate the light reflected from the concave mirror 406 and generate a projection image.

Figure 5:
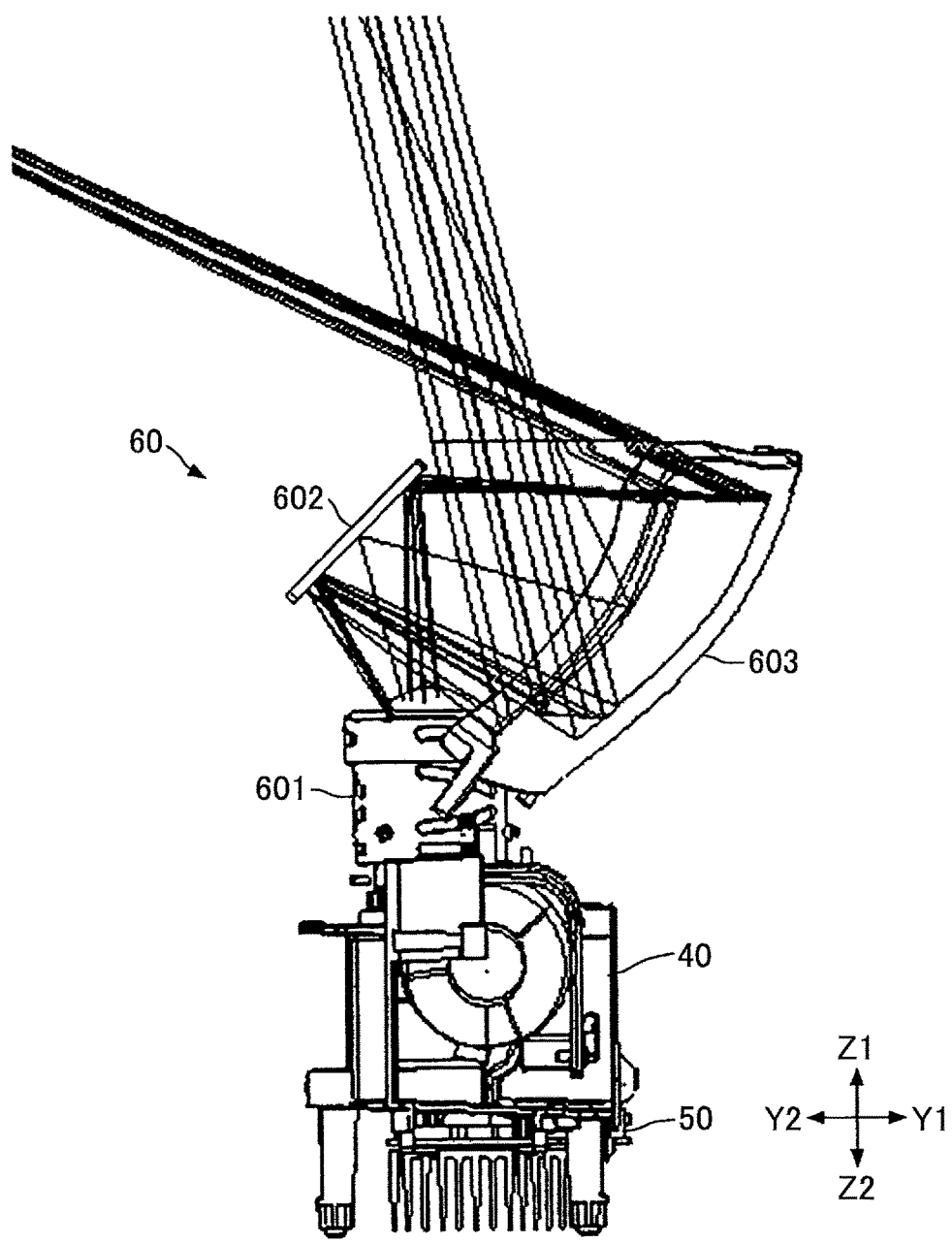
FIG. 5 is a diagram showing an internal configuration of a projection optical system unit.

FIG. 5 is a diagram showing an internal configuration of the projection optical system unit 60. As shown in FIG. 5, the projection optical system unit 60 includes projection lenses 601, a folding mirror 602, and a curved surface mirror 603 which are provided in a housing of the projection optical system unit 60.

The projection lenses 601 include a plurality of lenses. The projection lenses 601 function to focus the projection image generated by the DMD 551 of the image displaying unit 50 onto the folding mirror 602. The folding mirror 602 and the curved surface mirror 603 function to reflect the focused projection image so as to be enlarged, and project the resulting image on the screen S which is provided outside the projector 1.

Figure 6:
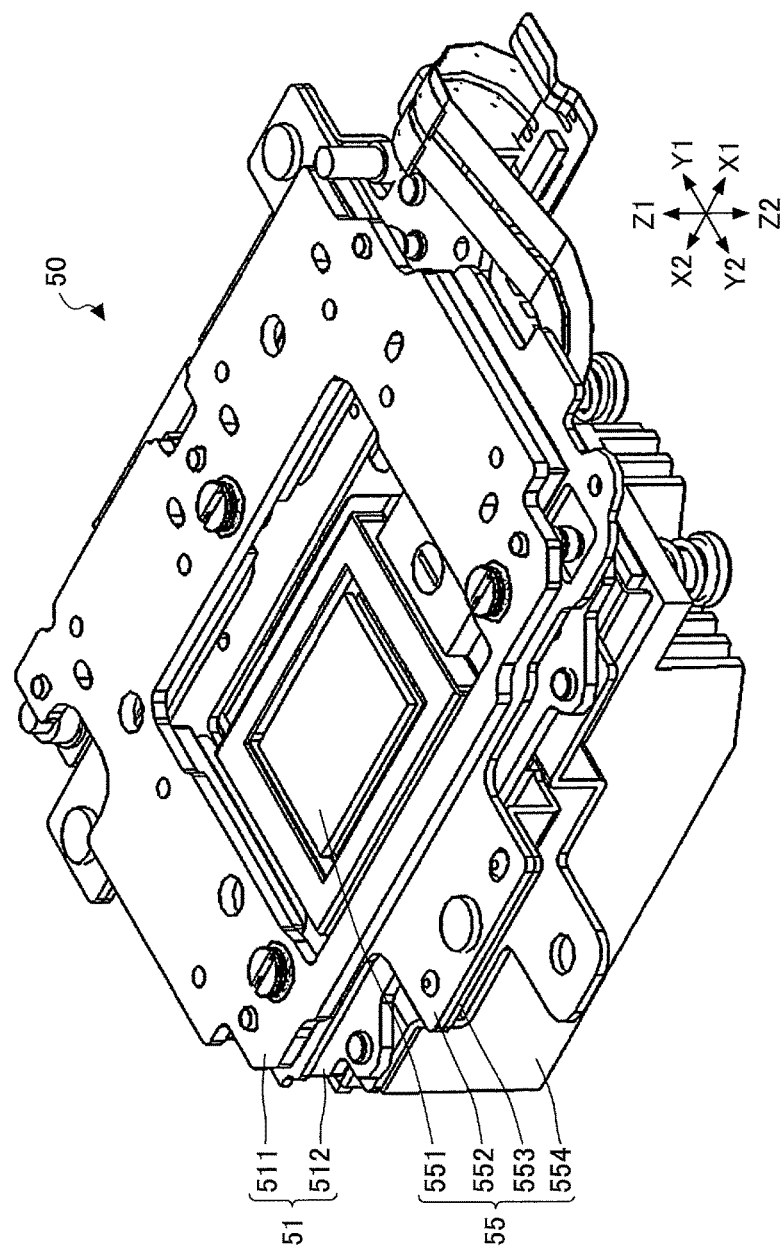
FIG. 6 is a perspective view of an image displaying unit.
Figure 7:
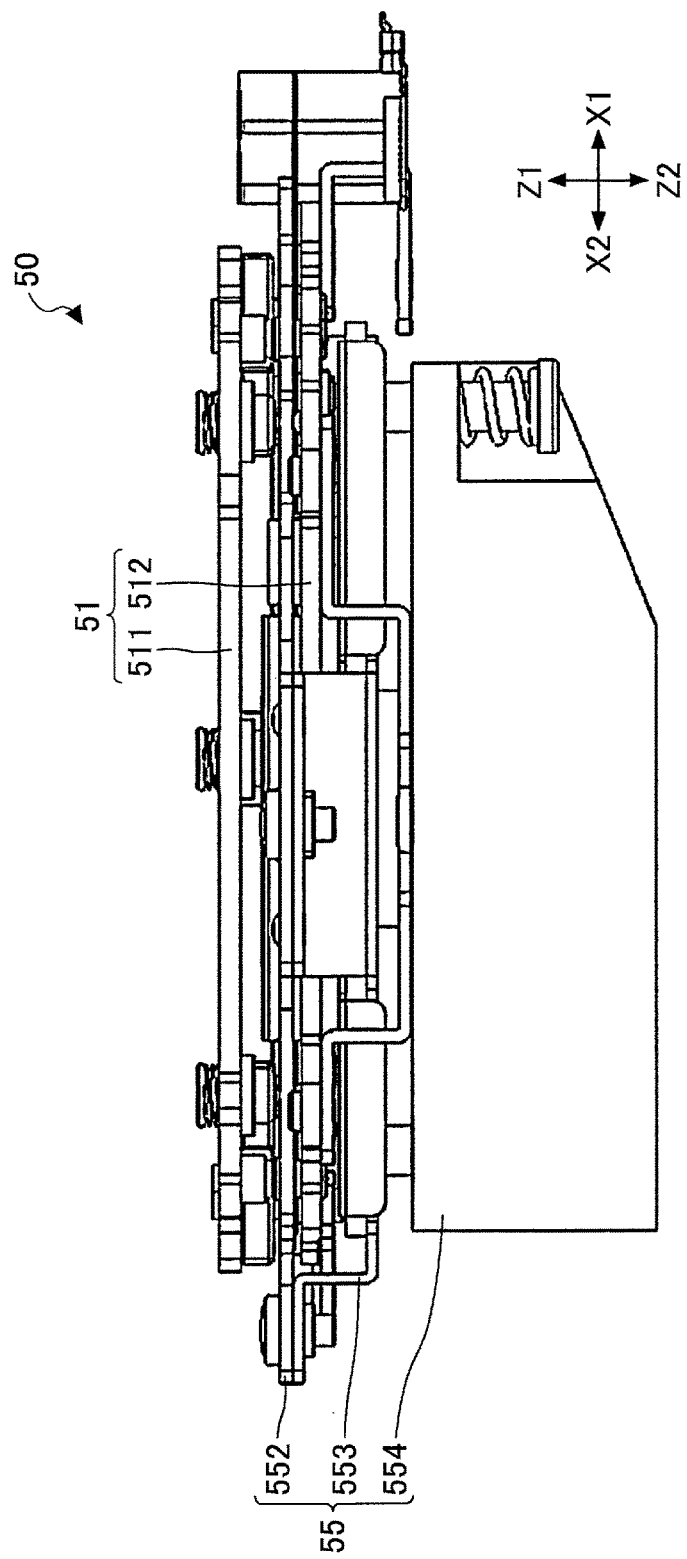
FIG. 7 is a side view of the image displaying unit.

FIG. 6 is a perspective view of the image displaying unit 50. FIG. 7 is a side view of the image displaying unit 50.

As shown in FIG. 6 and FIG. 7, the image displaying unit 50 includes the fixed unit 51 which is fixed and supported, and the movable unit 55 which is provided to be movable to the fixed unit 51.

The fixed unit 51 includes a top plate 511 as a first fixed member, and a base plate 512 as a second fixed member. In the fixed unit 51, the top plate 511 and the base plate 512 are held in parallel and face each other via a predetermined gap between them. The fixed unit 51 is fixed to the bottom of the lighting optical system unit 40.

The movable unit 55 includes the DMD 551, a movable plate 552 as a first movable member, a joint plate 553 as a second movable member, and a heat sink 554. The movable unit 55 is supported to be movable relative to the fixed unit 51 by the fixed unit 51.

The movable plate 552 is provided between the top plate 511 and the base plate 512 of the fixed unit 51. The movable plate 552 is supported by the fixed unit 51 to be movable in a direction which is parallel to the top plate 511 and the base plate 512 and parallel to the surface of the movable plate 552.

The joint plate 553 is fixed to the movable plate 552 with the base plate 512 of the fixed unit 51 being inserted between the movable plate 552 and the joint plate 553. The DMD 551 is fixed to a top surface of the joint plate 553, and the heat sink 554 is fixed to a bottom surface of the joint plate 553. The joint plate 553, which is fixed to the movable plate 552, is supported by the fixed unit 51 to be movable relative to the fixed unit 51 integrally with the movable plate 552, the DMD 551, and the heat sink 554.

The DMD 551 is mounted on a surface of the joint plate 553 on the movable plate 552 side. The DMD 551 is provided to be movable integrally with the movable plate 552 and the joint plate 553. The DMD 551 includes an image generation surface on which a plurality of rotatable micromirrors are arrayed in a lattice formation. A specular surface of each of the micromirrors of the DMD 551 is provided to be slantingly rotatable around a twist shaft. The ON/OFF drive of the micromirrors of the DMD 551 is performed based on an image signal transmitted from the image control unit 11 of the system control unit 10.

For example, in an ON state, an inclination angle of a micromirror is controlled so that the micromirror reflects the light from the light source 30 to the projection optical system unit 60, and in an OFF state, the inclination angle of the micromirror is controlled so that the micromirror reflects the light from the light source 30 to an OFF light plate.

In this manner, the inclination angle of each of the micromirrors of the DMD 551 is controlled based on the image signal transmitted from the image control unit 11, and the light emitted from the light source 30 and passing through the lighting optical system unit 40 is modulated and a projection image is generated by the DMD 551.

The heat sink 554 is an example of a heat dissipation unit in the claims. The heat sink 554 is provided so that the heat sink 554 at least partially contacts the DMD 551. Integrally with the DMD 551, the heat sink 554 is mounted on the joint plate 553 which is supported to be movable, and it is possible to efficiently cool the DMD 551 by the contact of the heat sink 554 with the DMD 551. By this configuration of the heat sink 554, the projector 1 is capable of preventing the temperature of the DMD 551 from increasing and capable of reducing problems, such as malfunction and failure, due to the temperature rise of the DMD 551.

Figure 8:
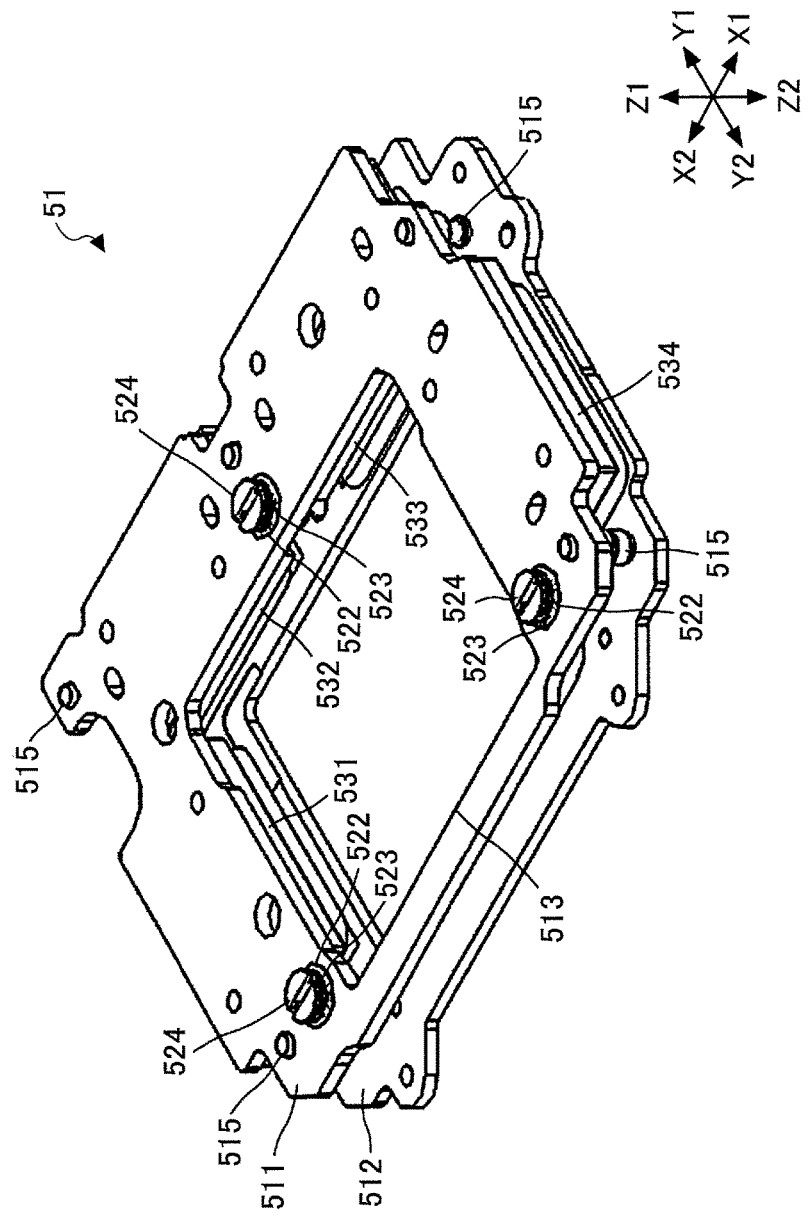
FIG. 8 is a perspective view of a fixed unit.
Figure 9:
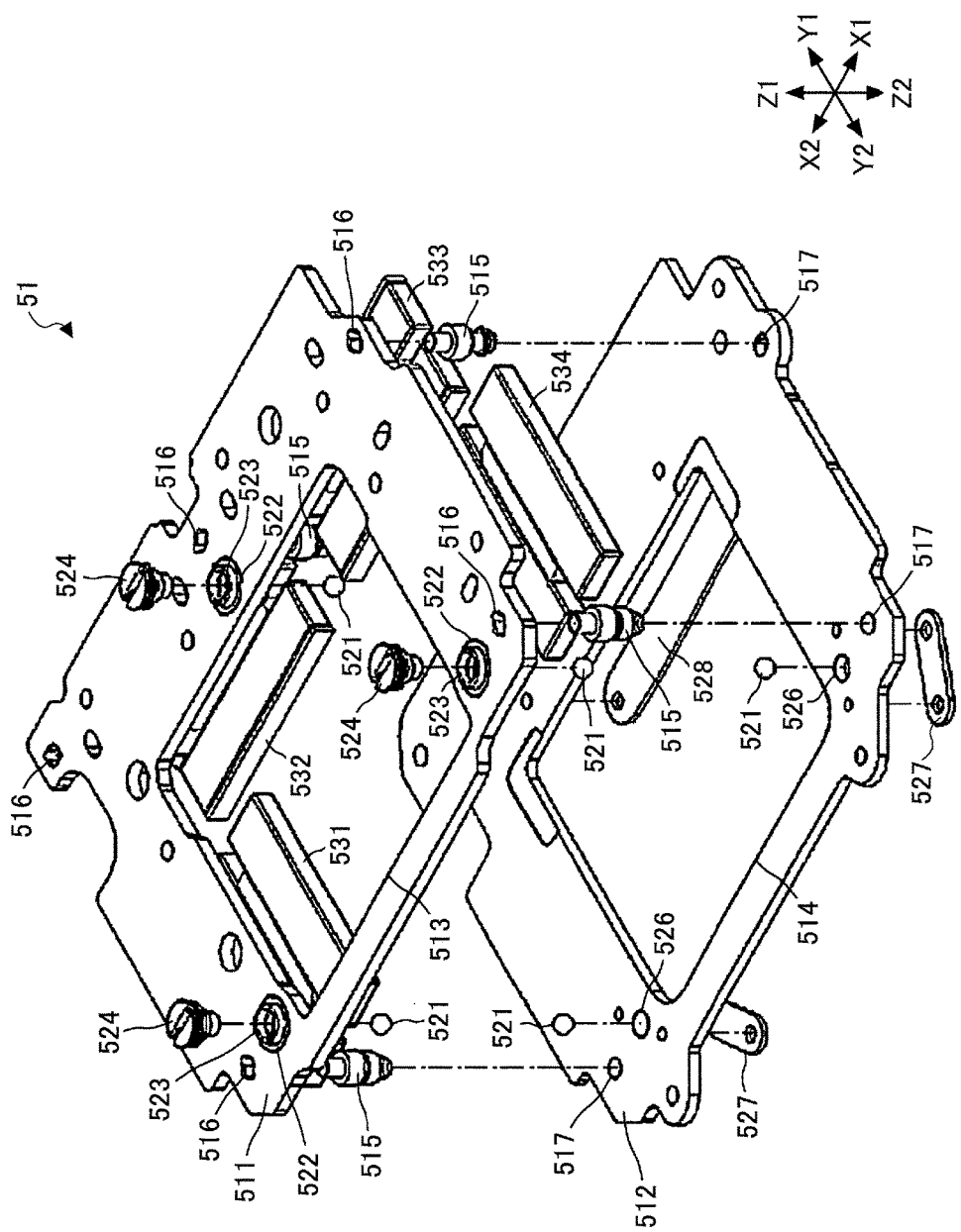
FIG. 9 is an exploded perspective view of the fixed unit.

FIG. 8 is a perspective view of the fixed unit 51. FIG. 9 is an exploded perspective view of the fixed unit 51.

As shown in FIG. 8 and FIG. 9, the fixed unit 51 includes the top plate 511 and the base plate 512. The top plate 511 and the base plate 512 are made of a flat-shaped plate material. The top plate 511 has a central hole 513 formed in a position corresponding to the DMD 551 of the movable unit 55. The base plate 512 has a central hole 514 formed in a position corresponding to the DMD 551 of the movable unit 55. The top plate 511 and the base plate 512 are supported by plural supports 515 so that the top plate 511 and the base plate 512 are held in parallel and face each other via the predetermined gap between them.

As shown in FIG. 9, an upper end portion of each of the supports 515 is press fitted in a corresponding one of support holes 516 which are formed in the top plate 511, and a lower end portion of the support 515 is inserted in a corresponding one of support holes 517 which are formed in the base plate 512. The lower end portion of each of the supports 515 is formed with an external thread groove. The supports 515 support the top plate 511 and the base plate 512 so that the top plate 511 and the base plate 512 are held in parallel and face each other via the predetermined gap between them.

Moreover, support holes 522 are formed in the top plate 511 to hold support balls 521 rotatably, and support holes 526 are formed in the base plate 512 to hold support balls 521 rotatably.

Cylindrical holding members 523 each of which has an internal thread groove formed in an inner peripheral surface of the holding member 523 are inserted in the support holes 522 of the top plate 511. The holding members 523 hold the support balls 521 rotatably, respectively. Positioning screws 524 are inserted into upper end portions of the holding members 523, respectively. Lower end faces of the support holes 526 of the base plate 512 are closed by lid members 527 and 528, and the support holes 526 of the base plate 512 hold the support balls 521 rotatably.

The support balls 521 which are rotatably held by the support holes 522 and 526 of the top plate 511 and the base plate 512 are respectively in contact with the movable plate 552 provided between the top plate 511 and the base plate 512. Hence, the support balls 521 movably support the movable plate 552.

Figure 10:
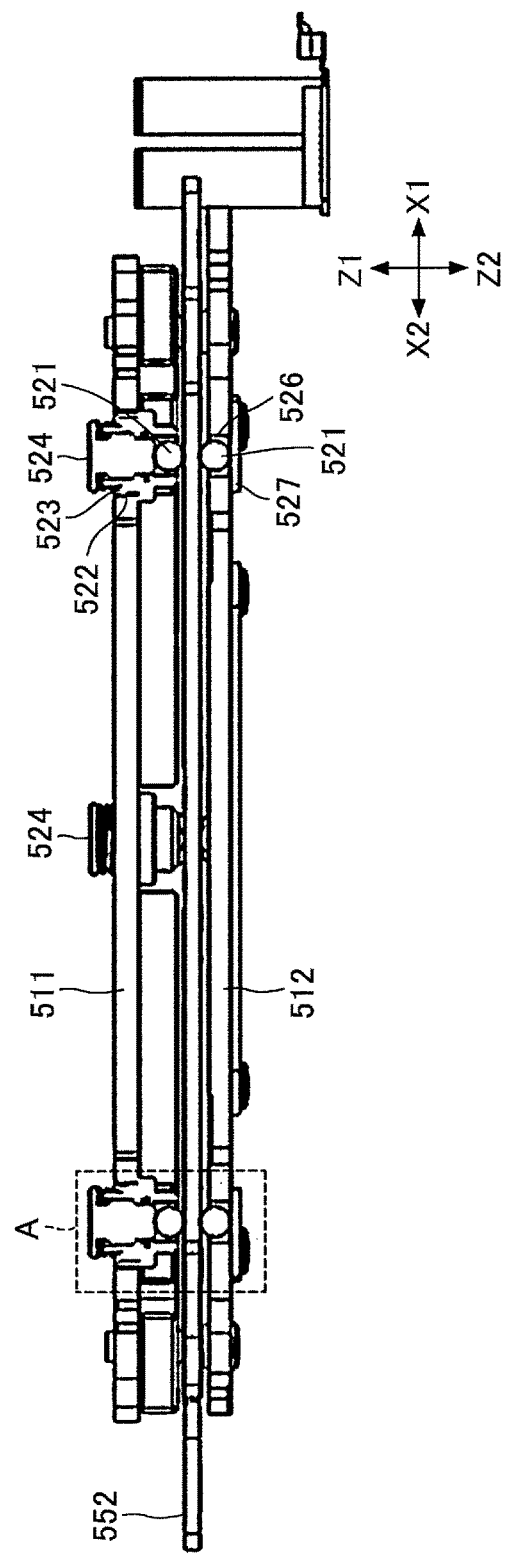
FIG. 10 is a diagram showing a support structure of a movable plate held by the fixed unit.
Figure 11:
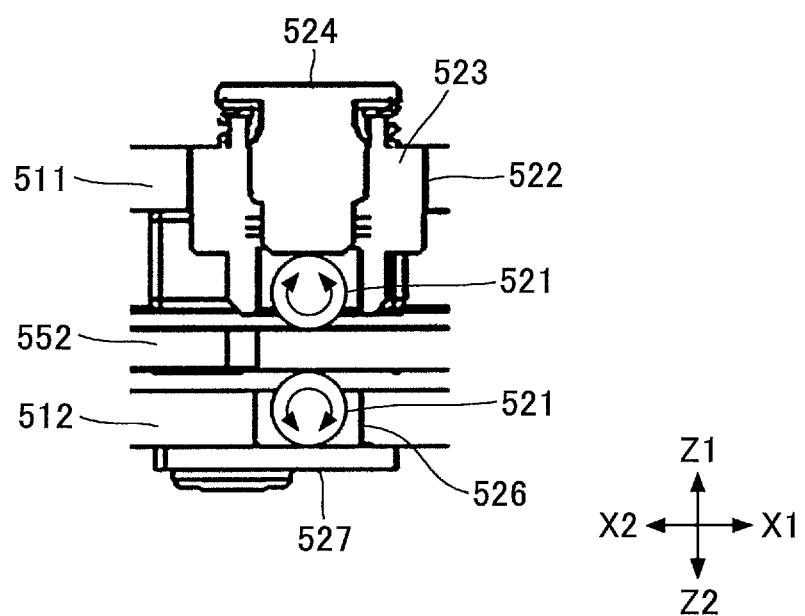
FIG. 11 is an enlarged diagram showing a portion of the support structure of the movable plate held by the fixed unit.

FIG. 10 is a diagram showing a support structure of the movable plate 552 by the fixed unit 51. FIG. 11 is an enlarged diagram showing a portion (indicated by the letter "A" in FIG. 10) of the support structure of the movable plate 552 by the fixed unit 51.

As shown in FIG. 10 and FIG. 11, in the top plate 511, the support balls 521 are rotatably held by the holding members 523 which are inserted in the support holes 522. In the base plate 512, the support balls 521 are rotatably held by the support holes 526 the lower end faces of which are closed by the lid members 527 and 528.

Each of the support balls 521 is held so that the support ball 521 projects at least partially from the support hole 522 or the support hole 526. Each of the support balls 521 contacts the movable plate 552 provided between the top plate 511 and the base plate 512 to support the movable plate 552. The top surface and the bottom surface of the movable plate 552 are supported by the rotatably held support balls 521 so that the movable plate 552 is movable in the direction which is parallel to the top plate 511 and the base plate 512 and parallel to the top and bottom surfaces of the movable plate 552.

Moreover, the amount of projection of the support ball 521 (provided on the top plate 511 side) from the lower end of the holding member 523 is varied depending on a position of the positioning screw 524 (which contacts the support ball 521 on the side opposite to the movable plate 552). For example, if the positioning screw 524 is displaced in the Z1 direction (upward), the amount of projection of the support ball 521 is decreased and the gap between the top plate 511 and the movable plate 552 is decreased. On the other hand, if the positioning screw 524 is displaced in the Z2 direction (downward), the amount of projection of the support ball 521 is increased and the gap between the top plate 511 and the movable plate 552 is increased.

Hence, the gap between the top plate 511 and the movable plate 552 may be appropriately adjusted by changing the amount of projection of the support ball 521 using the positioning screw 524.

Moreover, as shown in FIG. 8 and FIG. 9, magnets 531, 532, 533 and 534 are mounted on a bottom surface of the top plate 511 on the base plate 512 side.

Figure 12:
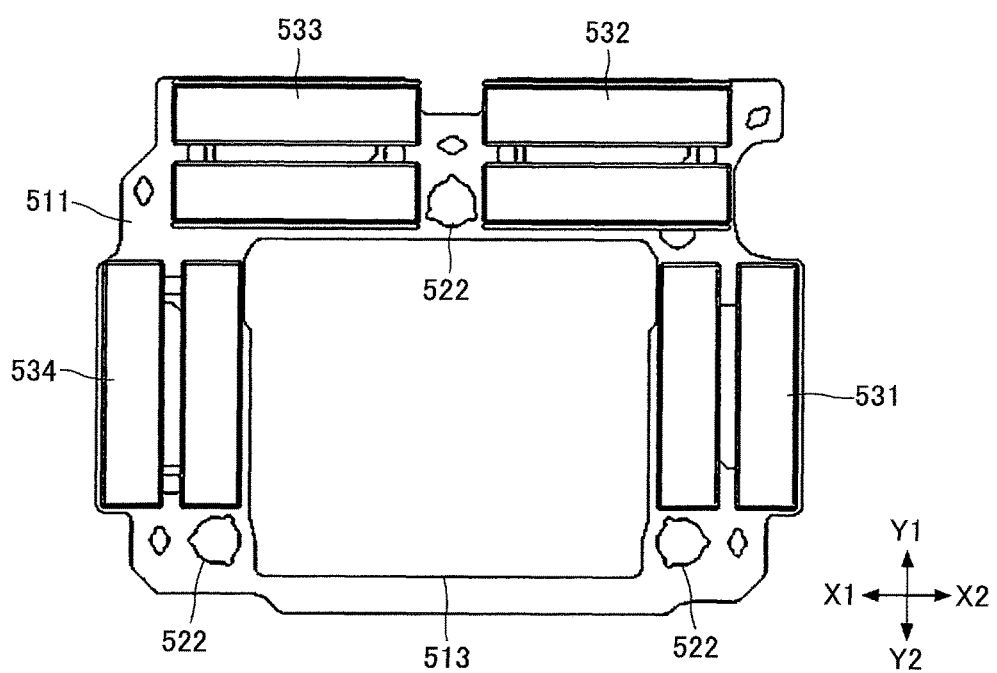
FIG. 12 is a bottom view of a top cover.

FIG. 12 is a bottom view of the top plate 511. As shown in FIG. 12, the magnets 531, 532, 533 and 534 are mounted on the bottom surface of the top plate 511 on the base plate 512 side.

The magnets 531, 532, 533 and 534 are provided at four locations which surround the central hole 513 of the top plate 511. Each of the magnets 531, 532, 533 and 534 is made of a pair of magnet pieces having a rectangular parallelepiped shape. The two magnet pieces of each pair are arranged side by side so that longitudinal directions of the two magnet pieces are parallel to each other. Each of the magnets 531, 532, 533 and 534 forms a magnetic field which functions to attract the movable plate 552.

Coils are provided on the top surface of the movable plate 552 to face the magnets 531, 532, 533 and 534, respectively. The magnets 531, 532, 533 and 534 on the top plate 511 and the corresponding coils on the movable plate 552 constitute a movement device configured to move the movable plate 552.

Note that the number and positions of the supports 515 and the support balls 521 which are provided on the fixed unit 51 are not limited to the configuration of this embodiment, and it is sufficient that the supports 515 and the support balls 521 are provided to support the movable plate 552 movably.

Figure 13:
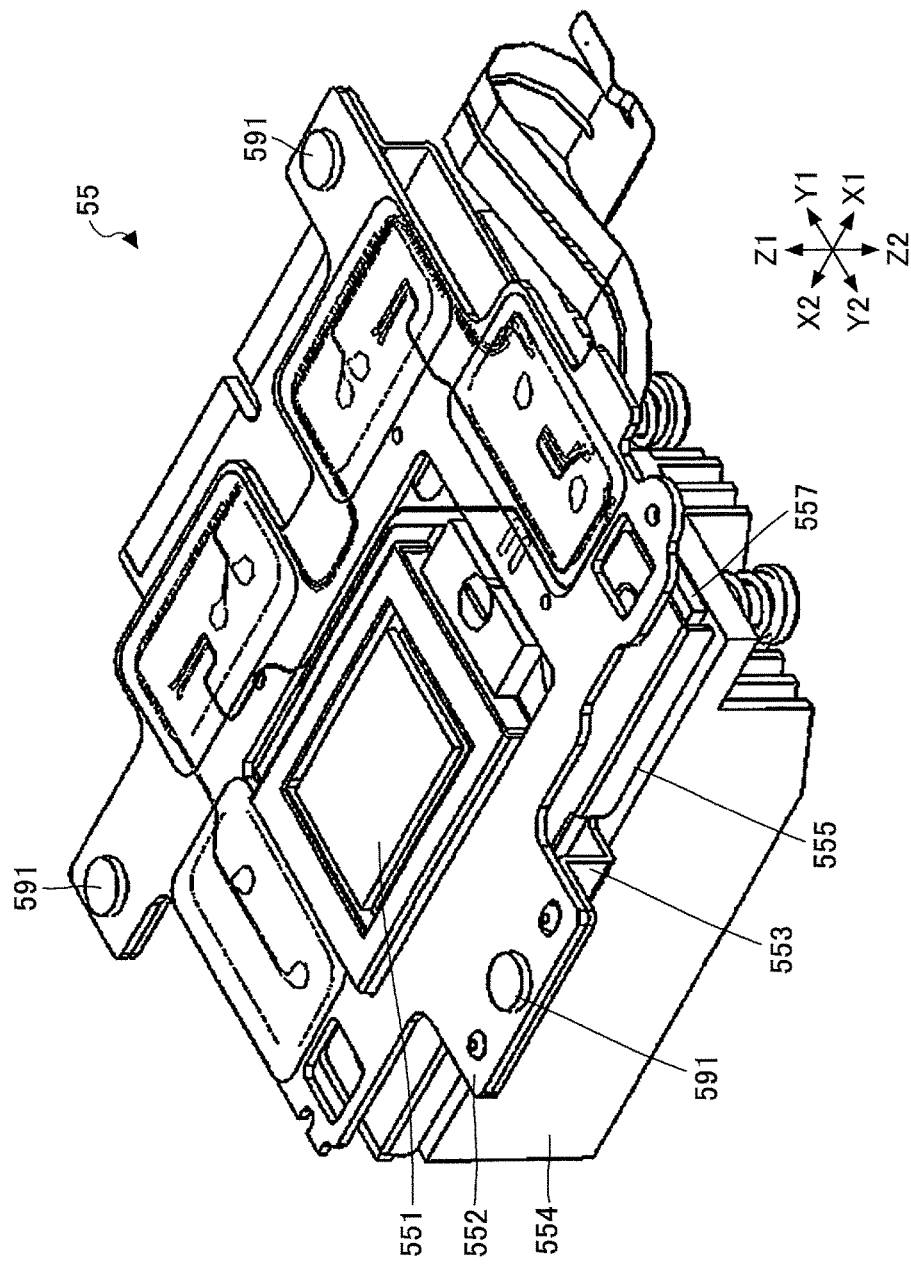
FIG. 13 is a perspective view of a movable unit.
Figure 14:
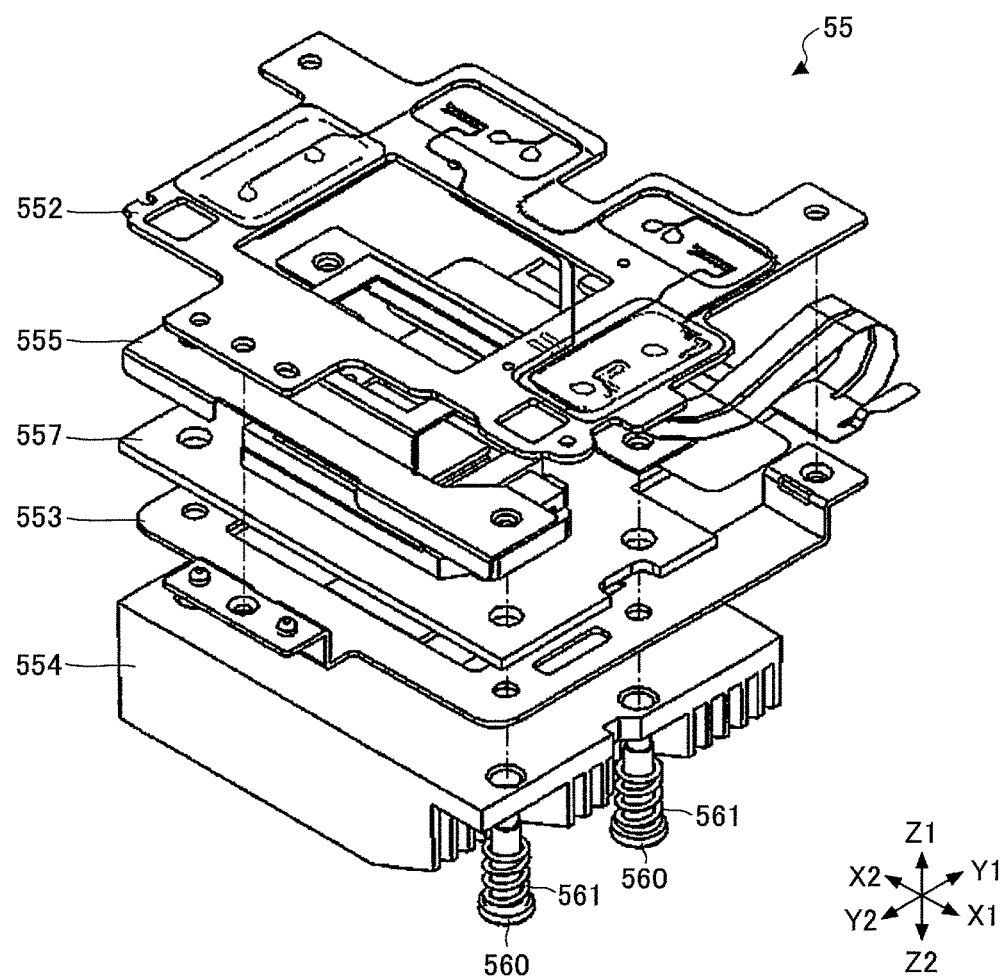
FIG. 14 is an exploded perspective view of the movable unit.

FIG. 13 is a perspective view of the movable unit 55. FIG. 14 is an exploded perspective view of the movable unit 55. As shown in FIG. 13 and FIG. 14, the movable unit 55 includes the DMD 551, the movable plate 552, the joint plate 553, the heat sink 554, a holding member 555, and a DMD base 557. The movable unit 55 is supported to be movable relative to the fixed unit 51.

As described above, the movable plate 552 is provided between the top plate 511 and the base plate 512 of the fixed unit 51 and supported by the support balls 521 to be movable in the direction parallel to the top and bottom surfaces of the movable plate 552.

Figure 15:
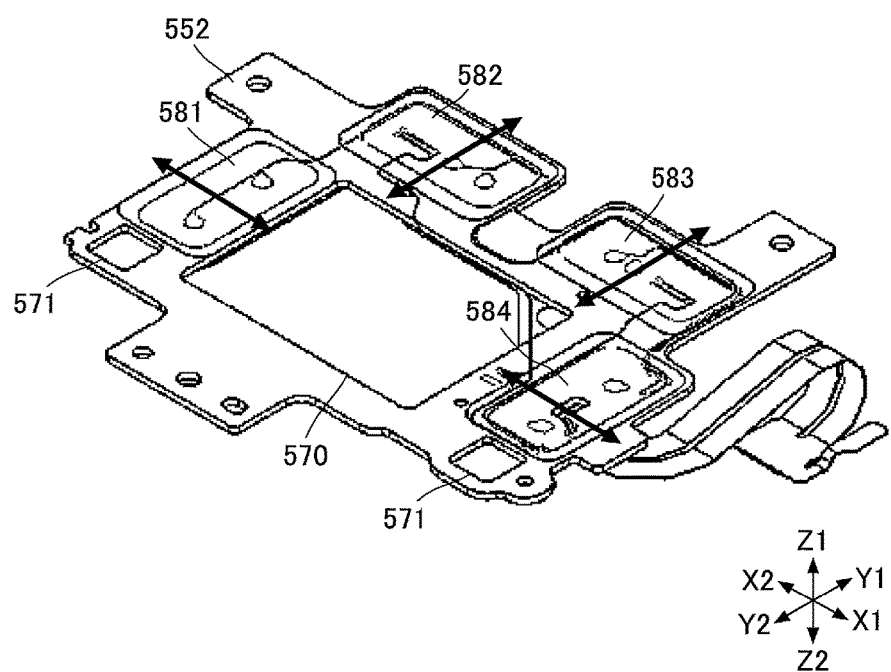
FIG. 15 is a perspective view of a movable plate.

FIG. 15 is a perspective view of the movable plate 552. As shown in FIG. 15, the movable plate 552 is made of a flat-shaped plate material. The movable plate 552 has a central hole 570 in the position corresponding to the DMD 551 which is mounted on the DMD base 557, and coils 581, 582, 583 and 584 are formed on the periphery of the central hole 570.

Each of the coils 581, 582, 583 and 584 is formed of electric wires wound around a shaft parallel to the Z1-Z2 directions. The coils 581, 582, 583 and 584 are provided in recesses formed in the bottom surface of the top plate 511 on the movable plate 552 side, and the coils are enclosed with coverings. The coils 581, 582, 583 and 584 on the movable plate 552 and the magnets 531, 532, 533 and 534 on the top plate 511 constitute the movement device configured to move the movable plate 552.

In the state in which the movable unit 55 is supported by the fixed unit 51, the magnets 531, 532, 533 and 534 on the top plate 511 and the coils 581, 582, 583 and 584 on the movable plate 552 are provided to face each other, respectively. When electric current flows through the coils 581, 582, 583 and 584, Lorentz forces as driving forces to move the movable plate 552 are generated by the magnetic fields formed by the coils 581, 582, 583 and 584 and the magnets 531, 532, 533 and 534.

The movable plate 552 is linearly moved or rotated to the fixed unit 51 within an XY plane by the Lorentz forces as the driving forces which are generated by the magnets 531, 532, 533 and 534 and the coils 581, 582, 583 and 584.

The magnitude and direction of the current flowing through each of the coils 581, 582, 583 and 584 are controlled by the movement control unit 12 of the system control unit 10. The movement control unit 12 controls the direction of movement (or rotation), the amount of movement and the rotational angle of the movable plate 552 by changing the magnitude and direction of the current flowing through each of the coils 581, 582, 583 and 584.

In this embodiment, the coil 581 and the magnet 531, and the coil 584 and the magnet 534 are arranged to face each other in the X1 and X2 directions, and the coils 581 and 584 and the magnets 531 and 534 are formed as a first drive unit. If electric current flows through the coils 581 and 584, Lorentz forces in the X1 or X2 direction are generated as shown in FIG. 15. The movable plate 552 is moved in the X1 or X2 direction by the Lorentz force generated by the coil 581 and the magnet 531 and the Lorentz force generated by the coil 584 and the magnet 534.

Moreover, in this embodiment, the coil 582 and the magnet 532, and the coil 583 and the magnet 533 are arranged side by side in the X1 or X2 direction as a second drive unit, and the longitudinal direction of the magnets 532 and 533 is arranged to be perpendicular to the longitudinal direction of the magnets 531 and 534. If electric current flows through the coil 582 and the coil 583, Lorentz forces in the Y1 or Y2 direction are generated as shown in FIG. 15.

The movable plate 552 may be moved in the Y1 or Y2 direction by the Lorentz force generated by the coil 582 and the magnet 532 and the Lorentz force generated by the coil 583 and the magnet 533 with the directions of the Lorentz forces being the same. Moreover, the movable plate 552 may be rotated in the XY plane by the Lorentz force generated by the coil 582 and the magnet 532, and the Lorentz force generated by the coil 583 and the magnet 533 with the directions of the Lorentz forces being opposite to each other.

For example, if electric current is supplied so that a Lorentz force in the Y1 direction is generated by the coil 582 and the magnet 532 and a Lorentz force in the Y2 direction is generated by the coil 583 and the magnet 533, the movable plate 552 is rotated clockwise in a top view. On the other hand, if electric current is supplied so that a Lorentz force in the Y2 direction is generated by the coil 582 and the magnet 532 and a Lorentz force in the Y1 direction is generated by the coil 583 and the magnet 533, the movable plate 552 is rotated counterclockwise in a top view.

In the movable plate 552, movable range restriction holes 571 are formed at locations corresponding to the supports 515 of the fixed unit 51. The supports 515 of the fixed unit 51 are inserted in the movable range restriction holes 571. If the movable plate 552 is greatly moved due to vibration or certain malfunction, the supports 515 come in contact with the movable range restriction holes 571, and the movable range of the movable plate 552 may be restricted.

As described above, in this embodiment, the movement control unit 12 of the system control unit 10 is configured to move the movable plate 552 to an arbitrary position within the movable range by controlling the magnitude and directions of the current flowing through the coils 581, 582, 583 and 584.

Note that the number and positions of the coils 581, 582, 583 and 584 and the magnets 531, 532, 533 and 534, which constitute the movement device, are not limited to this embodiment. Another embodiment different from this embodiment may be used if the movable plate 552 can be moved to an arbitrary position. For example, the magnets in the movement device may be mounted on the top surface of the top plate 511, or mounted on any of the surfaces of the base plate 512. Alternatively, the magnets may be mounted on the movable plate 552, and the coils may be mounted on the top plate 511 or the base plate 512.

Moreover, the number, the positions, and the shape of the movable range restriction holes 571 are not limited to the configuration of this embodiment. For example, one movable range restriction hole or plural movable range restriction holes 571 may be provided. The movable range restriction holes 571 may have a rectangular or circular shape.

As shown in FIG. 13, the joint plate 553 is fixed to the bottom surface of the movable plate 552 (on the base plate 512 side), and the movable plate 552 is movably supported by the fixed unit 51. The joint plate 553 is made of a flat-shaped plate material. The joint plate 553 has a central hole in the position corresponding to the DMD 551. Folded portions provided on the periphery of the joint plate 553 are fixed to the bottom surface of the movable plate 552 by three screws 591 (see FIG. 13).

Figure 16:
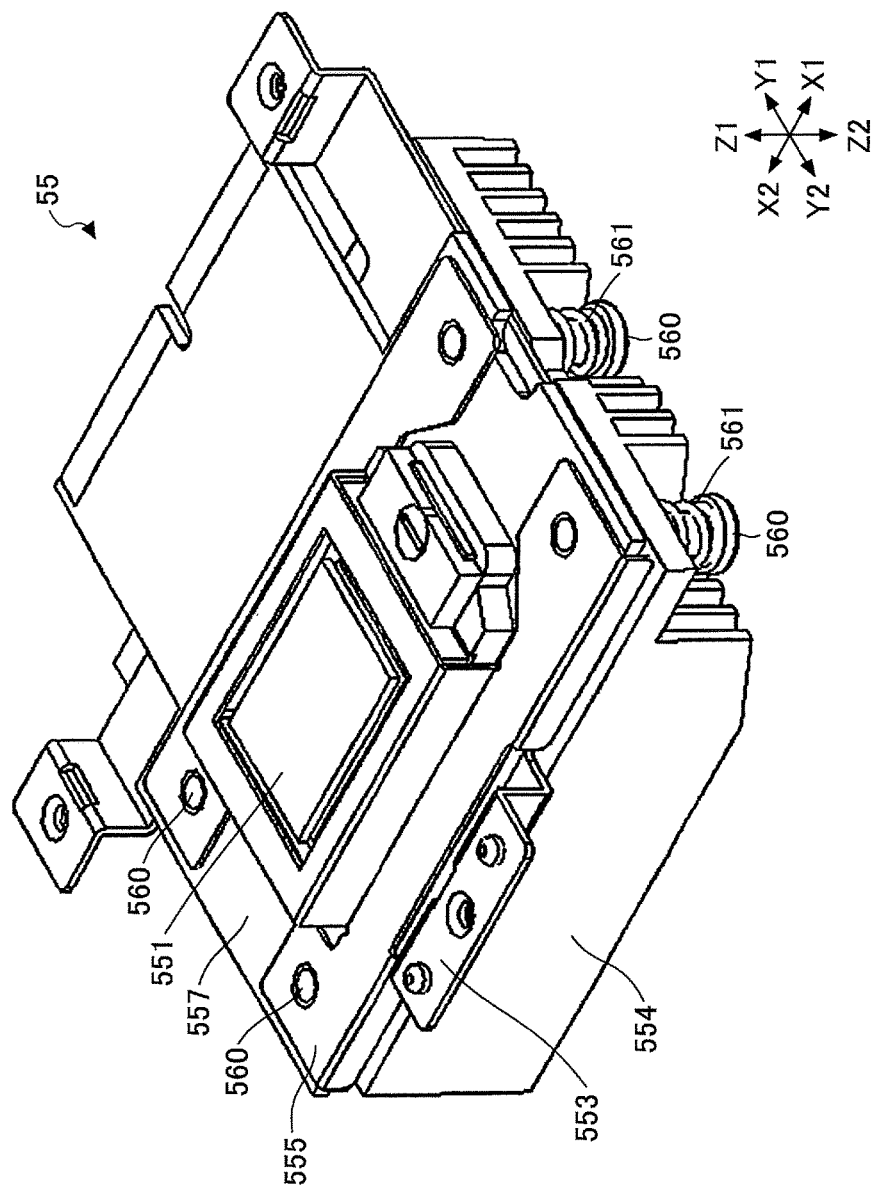
FIG. 16 is a perspective view of the movable unit from which the movable plate is removed.

FIG. 16 is a perspective view of the movable unit 55 from which the movable plate 552 is removed. As shown in FIG. 16, the DMD 551 is mounted on the top surface of the joint plate 553 and the heat sink 554 is mounted on the bottom surface of the joint plate 553. The joint plate 553, which is fixed to the movable plate 552, is provided to be movable relative to the fixed unit 51 according to the movement of the movable plate 552 integrally with the DMD 551 and the heat sink 554.

The DMD 551 is mounted on the DMD base 557, and the DMD base 557 is interposed between the holding member 555 and the joint plate 553. Hence, the DMD 551 is fixed to the joint plate 553 via the DMD base 557. As shown in FIG. 14 and FIG. 16, the holding member 555, the DMD base 557, the joint plate 553, and the heat sink 554 are laminated and fixed by shoulder screws 560 (which are fastener members) and springs 561 (which are pressure units).

Figure 17:
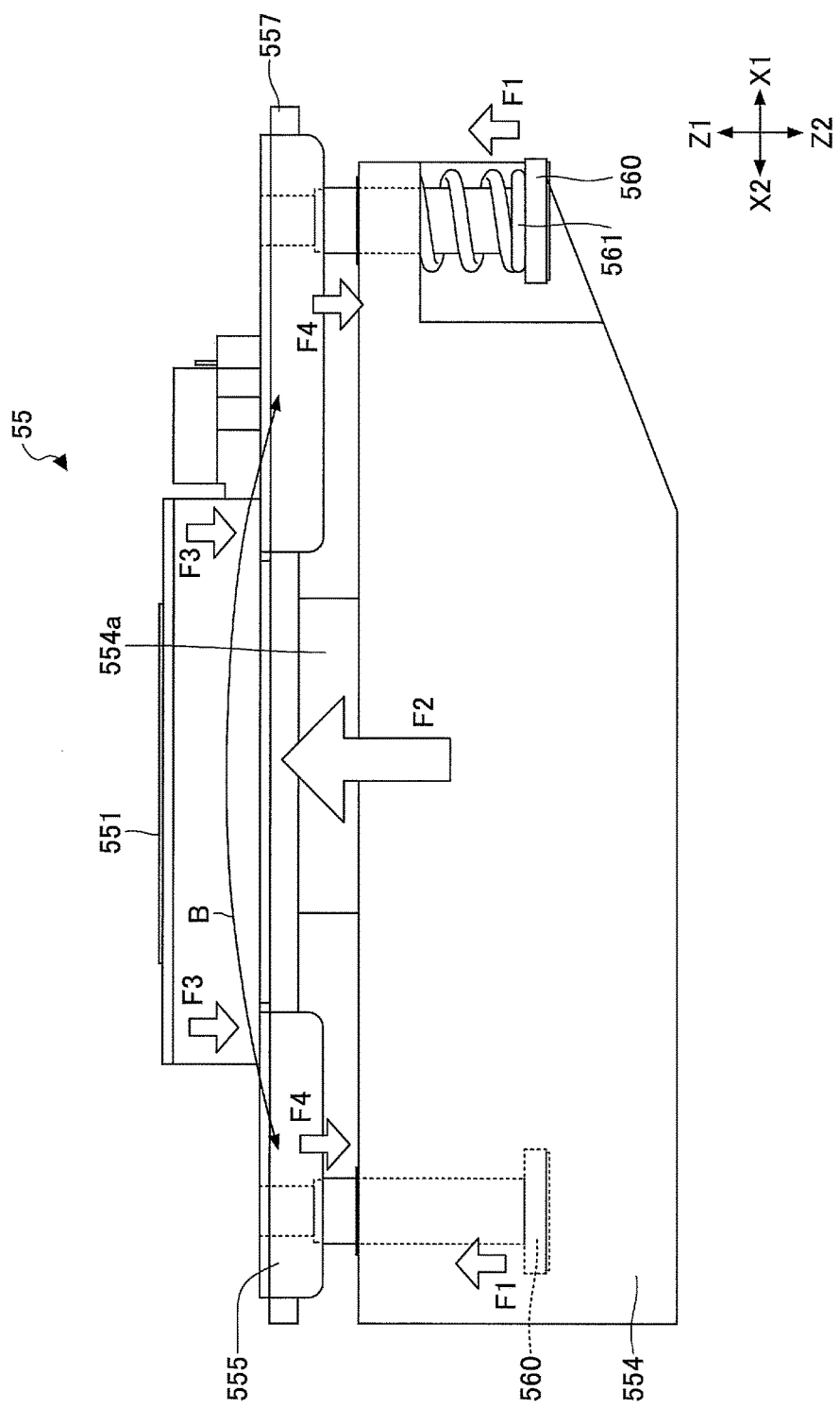
FIG. 17 is a diagram showing a DMD holding structure of the movable unit.

FIG. 17 is a diagram showing a DMD holding structure of the movable unit 55. FIG. 17 is a side view of the movable unit 55, and in FIG. 17, the illustration of the movable plate 552 and the joint plate 553 is omitted.

As shown in FIG. 17, the heat sink 554 includes a projection 554a which contacts the bottom surface of the DMD 551 via a through hole formed in the DMD base 557 when the heat sink 554 is fixed to the joint plate 553. Note that, alternatively, the projection 554a of the heat sink 554 may be a projection provided on the bottom surface of the DMD base 557 to contact the position of the heat sink 554 corresponding to the DMD 551.

In order to increase the effect of cooling the DMD 551 by the heat sink 554, a heat transfer sheet that is elastically deformable may be interposed between the projection 554a of the heat sink 554 and the DMD 551. In such a case, the thermal conductivity between the projection 554a of the heat sink 554 and the DMD 551 will be increased by the heat transfer sheet, and thereby the effect of cooling the DMD 551 by the heat sink 554 will be increased.

As described above, the holding member 555, the DMD base 557, and the heat sink 554 are laminated and fixed by the shoulder screws 560 and the springs 561. If the shoulder screws 560 are tightened, the springs 561 are compressed in the Z1-Z2 directions, and a force F1 in the Z1 direction (as indicated in FIG. 17) is produced by the spring 561. The heat sink 554 is pressed onto the DMD 551 by a force F2 in the Z1 direction which is the resultant of the forces F1 produced by the springs 561.

In this embodiment, the shoulder screws 560 and the springs 561 are provided at four locations, and the force F2 acting on the heat sink 554 is equal to the resultant of the forces F1 produced by the four springs 561. The force F2 from the heat sink 554 is exerted on the holding member 555 which holds the DMD base 557 on which the DMD 551 is mounted. As a result, a reaction force F3 in the Z2 direction equivalent to the force F2 from the heat sink 554 is exerted on the holding member 555, so that the DMD base 557 can be held between the holding member 555 and the joint plate 553.

A force F4 in the Z2 direction acts on the shoulder screws 560 and the springs 561 due to the force F3 acting on the holding member 555. Because the springs 561 are provided at four locations, the force F4 acting on each of the springs is equivalent to one fourth (¼) of the force F3 acting on the holding member 555, and the force F4 and the force F1 are in equilibrium.

The holding member 555 is formed like a leaf spring and made of a material which can be bent as indicated by the arrow B in FIG. 17. The holding member 555 is bent by the upward force from the projection 554a of the heat sink 554, the downward force to push back the heat sink 554 in the Z2 direction is produced by the holding member 555, and firm contact between the DMD 551 and the heat sink 554 can be maintained.

As described above, in the movable unit 55, the movable plate 552 and the joint plate 553 (on which the DMD 551 and the heat sink 554 are mounted) are movably supported by the fixed unit 51. The position of the movable unit 55 is controlled by the movement control unit 12 of the system control unit 10. Moreover, the heat sink 554 contacting the DMD 551 by pressure is mounted on the movable unit 55, and the projector 1 is capable of having reduced problems, such as malfunction and failure, due to the temperature rise of the DMD 551.

As described above, in the projector 1 of this embodiment, the DMD 551 which generates a projection image is mounted on the movable unit 55, and the position of the DMD 551 is controlled by the movement control unit 12 of the system control unit 10 together with the movable unit 55.

For example, the movement control unit 12 controls the position of the movable unit 55 by a high speed movement between positions lying apart by a distance less than the array interval of the micromirrors of the DMD 551 at a predetermined cycle corresponding to a frame rate during image projection.

At this time, the image control unit 11 transmits an image signal to the DMD 551 to generate a projection image shifted according to each of the positions.

For example, the movement control unit 12 performs reciprocation movement of the DMD 551 between two positions lying apart by the distance less than the array interval of the micromirrors of the DMD 551 in the X1-X2 directions and the Y1-Y2 directions at the predetermined cycle. At this time, the image control unit 11 controls the DMD 551 to generate a projection image shifted according to each of the positions, and it is possible to make the resolution of the projection image to be twice the resolution of the DMD 551. Moreover, the resolution of the projection image can be made to be more than twice the resolution of the DMD 551 by increasing the movement range of the DMD 551.

The movement control unit 12 moves the DMD 551 and the movable unit 55 at the predetermined cycle and the image control unit 11 controls the DMD 551 to generate the projection image according to the position. Hence, it is possible to obtain the resolution of the projection image which is higher than the resolution of the DMD 551.

In the projector 1 of this embodiment, the movement control unit 12 controls the DMD 551 so that the DMD 551 is rotated integrally with the movable unit 55, and the projection image can be rotated without reducing the size of the projection image. For example, in a conventional projector in which an image generation unit, such as a DMD, is fixed, if the size of a projection image is not reduced, the projection image cannot be rotated while maintaining the aspect ratio of the projection image. In contrast, in the projector 1 of this embodiment, the DMD 551 can be rotated, and the rotation of the DMD 551 and the adjustment of the inclination can be performed without reducing the size of the projection image.

As described in the foregoing, in the projector 1 of this embodiment, the movement of the DMD 551 is possible, and it is possible to provide an increased resolution of the projection image. Moreover, the DMD 551 and the heat sink 554 to cool the DMD 551 are mounted on the movable unit 55, the heat sink 554 is brought in contact with the DMD 551, the effect of cooling the DMD 551 by the heat sink 554 is increased, and the temperature rise of the DMD 551 is prevented. Hence, the projector 1 is capable of having reduced problems, such as malfunction and failure, due to the temperature rise of the DMD 551.

Figure 18A:
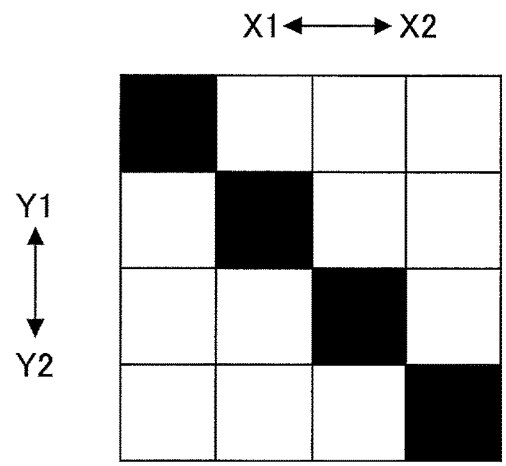
FIG. 18A is a diagram illustrating an enlarged view of the projection image in a case where the DMD is not moved.
Figure 18B:
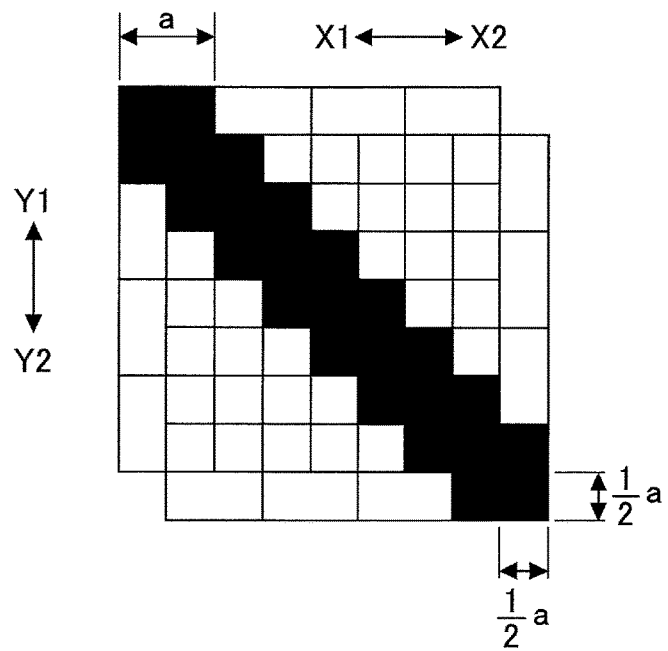
FIG. 18B is a diagram illustrating an enlarged view of the projection image in a case where the DMD 551 is moved back-and-forth at a predetermined cycle.

Next, an example of a process for increasing the resolution of the projection image will be described. FIG. 18A is a diagram illustrating an enlarged view of the projection image in a case where the DMD 551 is not moved. FIG. 18B is a diagram illustrating an enlarged view of the projection image in a case where the DMD 551 is moved back-and-forth within ½ distance of the array interval of the micromirrors of the DMD 551 in the X1-X2 directions and the Y1-Y2 directions at the predetermined cycle. Additionally, FIG. 18A and FIG. 18B shows an enlarged view of an image of line slanted at 45°.

As shown in FIG. 18A, in a case where the DMD 551 is not moved, the line slanted at 45° shows unevenness of the array interval of the micromirrors. In contrast, in a case where the DMD 551 is moved back-and-forth within ½ distance of the array interval of the micromirrors in the X1-X2 directions and the Y1-Y2 directions at the predetermined cycle, as shown in FIG. 18B, the line slanted at 45° shows unevenness of a/2, where the array interval of the micromirrors is indicated as "a". Thus, the resolution of the resolution of the projected image is twice that of a projected image in the case where the DMD 551 is not moved.

Figure 19A:
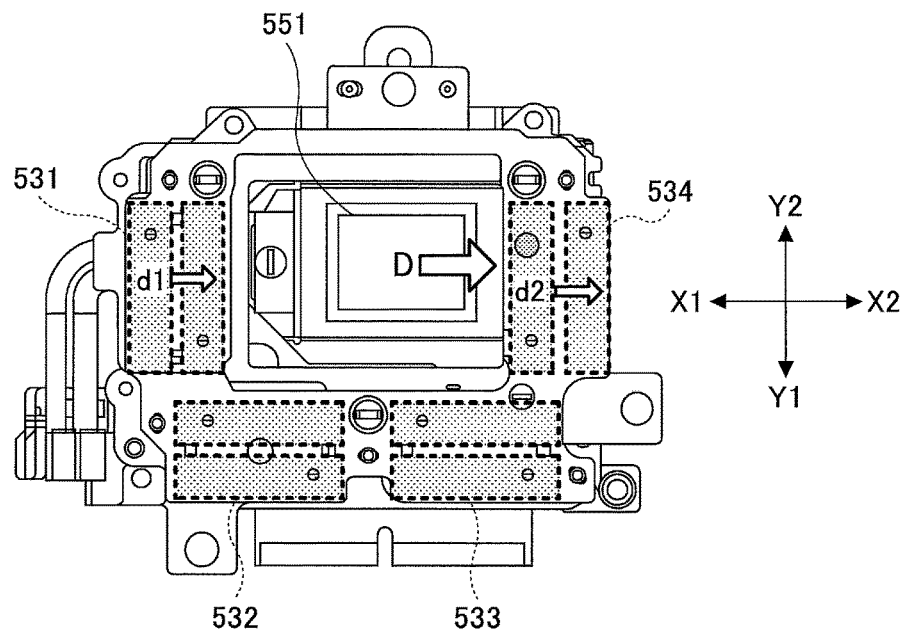
FIG. 19A is a diagram illustrating movement of the movable unit for adjusting a position of the projection image.

Also, in the present embodiment, not only increase of the resolution of the projection image but also correction of a position of the projection image can be achieved by controlling movable unit 55 to drive. In a case where the position of the projection image is corrected horizontally, electric current is supplied to flow through the coil 581 disposed to face the magnet 531 and the coil 584 disposed to face the magnet 534. Then, for example, Lorentz forces in the arrow d1 and d2 direction are generated between the magnet 531 and the coil 581 and between the magnet 534 and the coil 584 as shown in FIG. 19A. Thus, the movable unit 55 including the DMD 551 moves in a direction shown as an arrow "D" in FIG. 19A, and the projection image is shifted left or right, thereby adjusting the horizontal position. Additionally, in a case where the projection image is shifted in a direction opposite to the direction of FIG. 19A, electric current, whose direction is opposite to the direction of FIG. 19A, is supplied to flow through the coils 581 and 584. Thus, the movable unit 55 moves in a direction opposite to direction shown as an arrow "D" in FIG. 19A, and the projection image is shifted in a direction opposite to the direction of FIG. 19A, thereby adjusting the horizontal position.

Figure 19B:
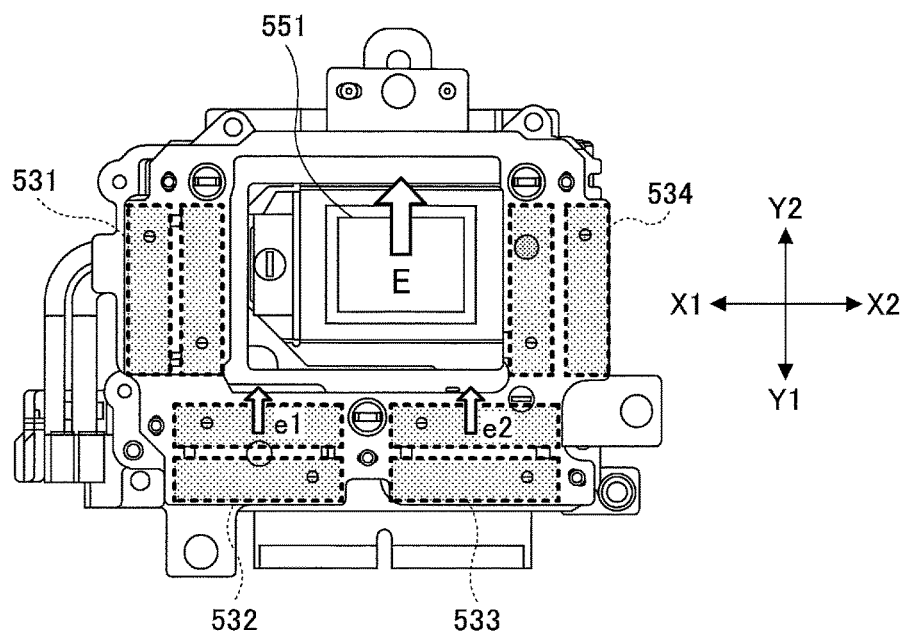
FIG. 19B is another diagram illustrating movement of the movable unit to adjust a position of the projection image.

In a case where the vertical position of the projected image is corrected, as shown in FIG. 19B, electric current is supplied to flow through the coil 582 disposed to face the magnet 532 and the coil 583 disposed to face the magnet 533. Then, Lorentz forces, in the arrow e1 and e2 direction, are generated between the magnet 532 and the coil 582 and between the magnet 533 and the coil 583. Thus, the movable unit 55 moves in a direction shown as an arrow "E" in FIG. 19B, and the projection image is shifted up or down, thereby adjusting the vertical position. In a case where the projection image is shifted in a direction opposite to the direction of FIG. 19B, electric current, whose direction is opposite to the direction of FIG. 19B, is supplied to flow through the coils 582 and 583. Thus, the movable unit moves in a direction opposite to direction shown as an arrow "E" in FIG. 19B, and the projection image is shifted in a direction opposite to the direction of FIG. 19B.

Figure 19C:
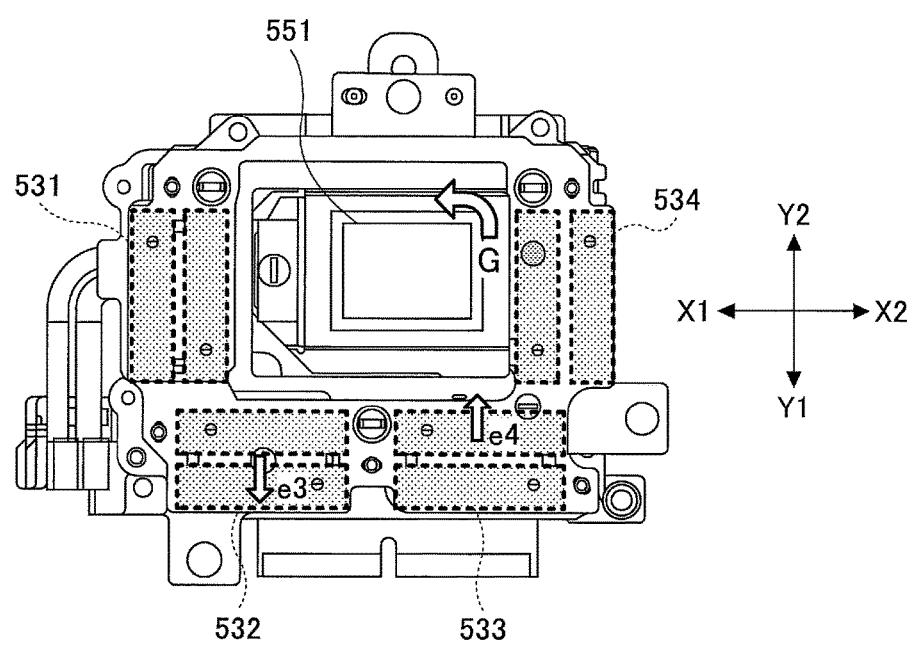
FIG. 19C is another diagram illustrating movement of the movable unit to adjust a position of the projection image.

Moreover, as shown in FIG. 19C, in a case where a gradient (inclination) of the projection image is adjusted, an electric current is supplied to flow through the coil 582 disposed to face the magnet 532 while another electric current is supplied to flow through the coil 583 in the opposite direction. Then, discrete Lorentz forces, in the arrow e3 and e4 direction, are generated between the magnet 532 and the coil 582 and between the magnet 533 and the coil 583. Thus, the DMD 551 is rotated in a direction shown as an arrow G in FIG. 19C. When the DMD 551 is rotated, the projection image is rotated, thereby adjusting the gradient of the projection image. When discrete Lorentz forces in directions respectively opposite to the directions of FIG. 19C are generated between the magnet 532 and the coil 582 and between the magnet 533 and the coil 583, the DMD 551 is rotated in a direction opposite to the direction of FIG. 19C to rotate the projection image in a direction opposite to the direction of FIG. 19C.

As described above, in the present embodiment, increasing the resolution of the projected image, and correcting the position of the projected image in the vertical and horizontal directions, as well as the gradient thereof, can be achieved by configuring the DMD 551 to be movable. Thus, the cost of the apparatus can be reduced in comparison to a case where a separate mechanism for correcting the position of the projection image is provided in addition to a mechanism for increasing the resolution of the projection image. Additionally, the correction of the projection image may be performed when the user operates the operation unit 7.

The DMD 551 is directly exposed with the light emitted from the light source 30, and the DMD 551 is heated by energy of the light. Therefore, the DMD 551 needs to be cooled to be at a temperature equal to or less than a rated temperature. Examples of methods for cooling the DMD 551 are an air cooling method in which the DMD 551 is cooled by directly blowing with a cool air, a method in which the DMD is pressed against a heat sink to be cooled by using the thermal conduction, and the like. Because the air cooling method may cause dust to adhere to the surface of the DMD 551, the latter method, in which the DMD is pressed against the heat sink, is adopted in the present embodiment.

As described above, in the present embodiment, because the method in which the DMD 551 is pressed against the heat sink 554 is adopted, not only the DMD 551 but also the heat sink 554 against which the DMD 551 is pressed needs to be moved integrally. Generally, the heat sink 554 is formed of aluminum, and has a mass greater than that of the DMD 551. Therefore, the influence of gravity becomes more significant in comparison to a case where only DMD 551 is moved.

For example, in a case where the projector 1 is configured in a manner such that the movable unit 55, including the DMD 551 and the heat sink 554, moves back-and-forth in the vertical direction, the movable unit 55 falls in accordance with the gravity. On the other hand, the movable unit 55 moves upward against the gravity. Hence, if a driving condition to move downward the movable unit 55 is set similarly to a driving condition to move upward the movable unit 55, the movable unit 55 may be moved to exceed a specified position when the movable unit 55 moves downward. Or, the movable unit 55 may not be able to up to the specified upward position. Therefore, in a case where the projector is configured in a manner such that the movable unit 55 moves back-and-forth vertically, the driving force needs to be reduced by decreasing a value of the electric current flowing through the coil or a timing at which a driving direction switches needs to be set earlier when the movable unit 55 is driven downward. Or, the driving force needs to be increased by increasing the flow of electric current through the coil when the movable unit 55 is driven upward. Hence, a complex driving condition needs to be set.

Also, in order to rise up the movable unit 55 including the DMD 551 and the heat sink 554 against the gravity, electromagnet actuators formed by coils and magnets need to be increased or more expensive electromagnet actuators of higher output power is required.

Figure 20:
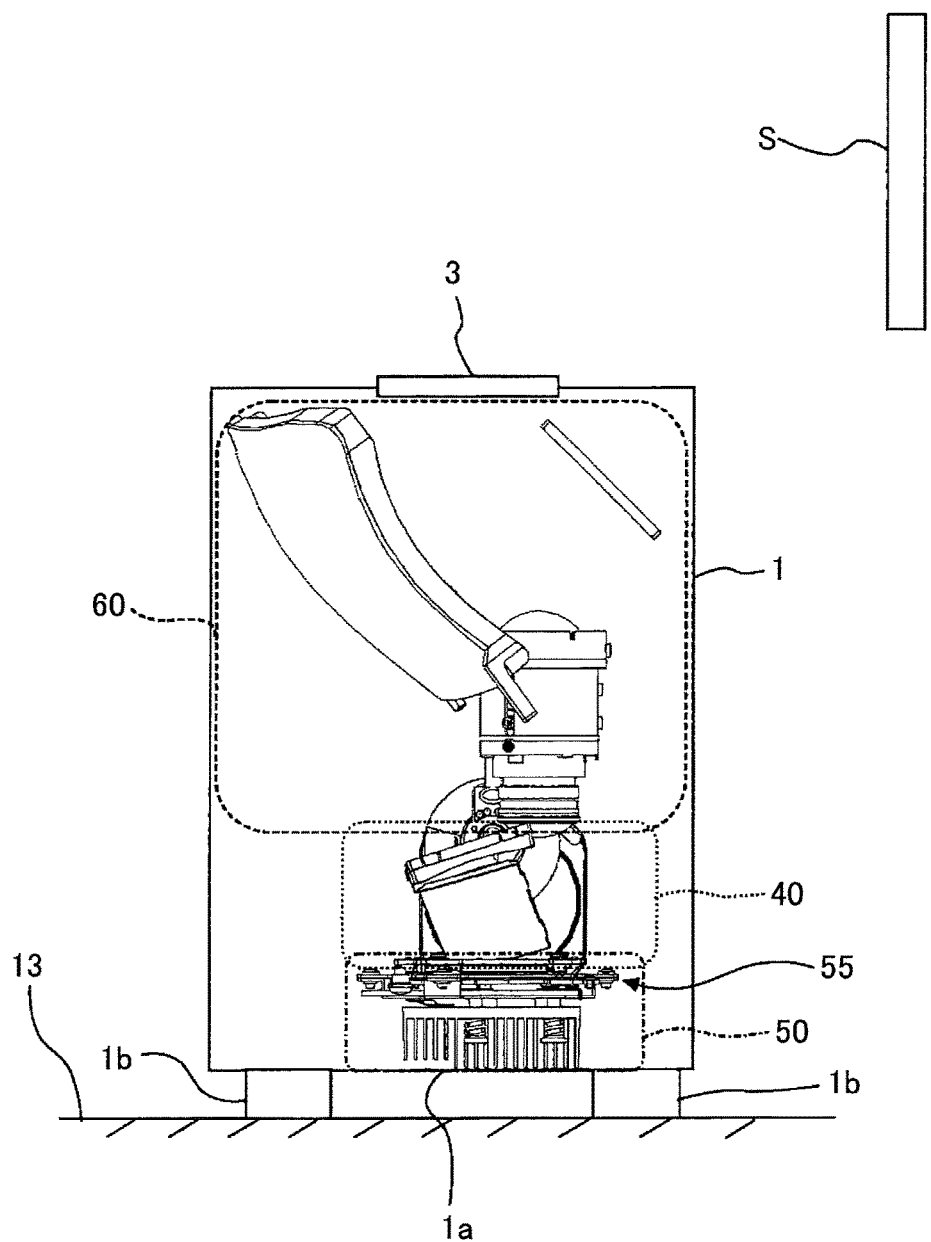
FIG. 20 is a diagram illustrating an arrangement of the movable unit in the apparatus of an embodiment.
Figure 21:
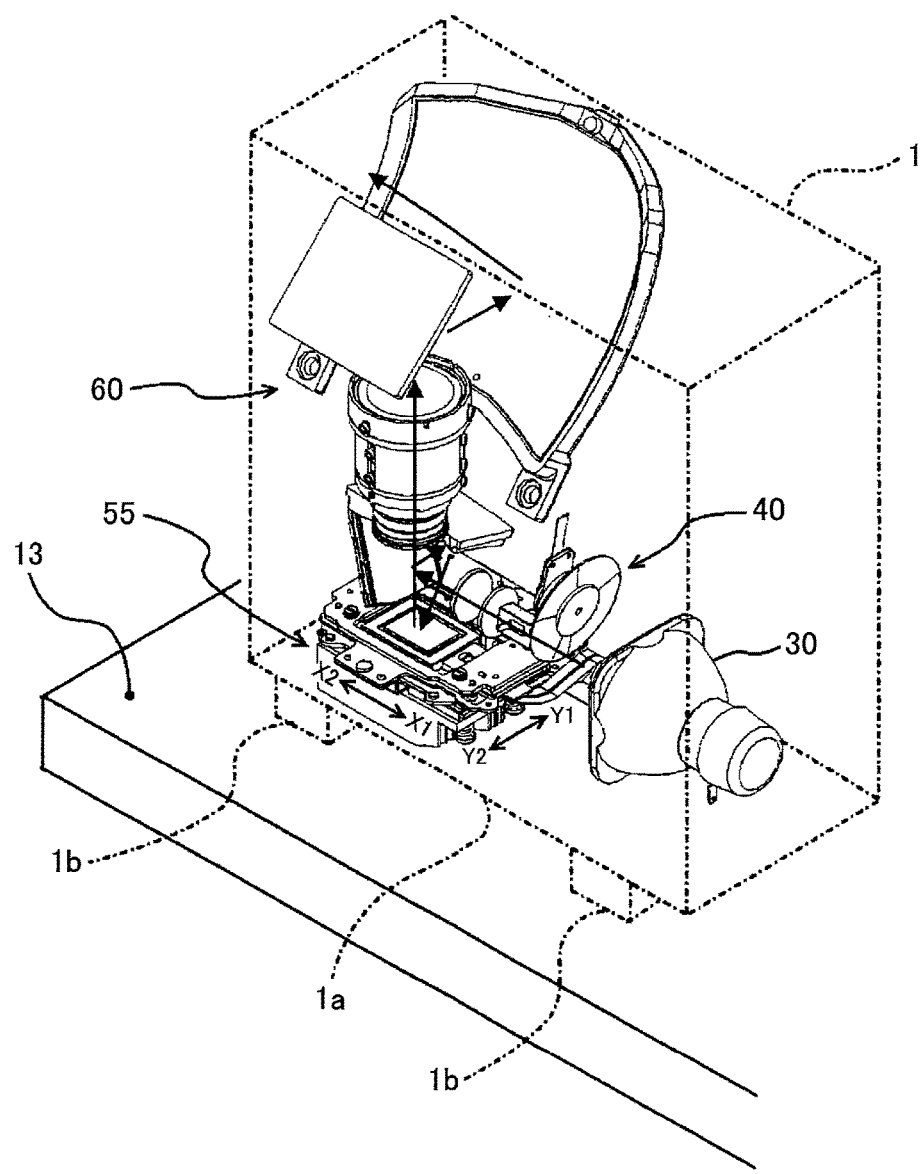
FIG. 21 is a perspective view illustrating the arrangement of the movable unit in the apparatus of an embodiment.

Therefore, in the present embodiment, as shown in FIG. 20 and FIG. 21, the movable unit 55 is disposed to move in horizontal direction in the apparatus. Additionally, the horizontal direction is a direction orthogonal to the direction of the gravity. That is, the movable unit 55 moving in the X1-X2 directions and the Y1-Y2 directions is disposed, where both the X1-X2 directions and the Y1-Y2 directions are included in the horizontal direction. Specifically, the movable unit 55 is disposed so that the movable unit 55 is parallel to an installation facing surface 1a that is a surface facing to an installation surface 13 such as desktop surface and floor surface. By disposing the movable unit 55 as described above, the light forming the image with the DMD 551 is emitted vertically upward because the image generation surface of the DMD 551 is disposed facing a top surface of a chassis of the projector. Further, the radiation window 3 is provided in the top surface of a chassis of the projector, where the top surface faces the installation facing surface 1a. Therefore, in the present embodiment, the projection optical system unit 60 is disposed at upper side of the movable unit 55, thereby projecting the projection image from the radiation window 3 provided in the top surface of the chassis of the projector.

Generally, the projector projects an image to a screen S that is disposed on a surface perpendicular to a horizontal surface. Therefore, except in a case of specific projection state, the projector is installed on the installation surface 13 so that the installation facing surface 1a thereof is horizontal by adjusting heights of three or four legs 1b disposed on the installation facing surface 1a. Therefore, when the movable unit 55 is disposed to be parallel to the installation facing surface 1a, the moving direction of the movable unit 55 is horizontal.

As described above, when the movable unit 55 is disposed to move horizontally, respective directions of X1, X2, Y1, and Y2, in which the movable unit 55 is moved, can be included in a direction orthogonal to the direction of the gravity. Thus, the movable unit 55 can be moved in any of X1, X2, Y1, and Y2 directions by the same amount corresponding to the same driving force. Therefore, in a case where the resolution of the projection image is increased by moving the movable unit 55 back-and-forth at a predetermined cycle, the same value of the electric current can be used and the timing at which the direction of the electric current is switched can be set the same regardless of the direction of movement of the movable unit 55. Thus, the movable unit 55 can be controlled to drive with a high precision without too much difficulty, and the resolution of the projection image can be increased through the control without too much difficulty.

Also, a high driving force is not required to move the movable unit 55 upward against gravity. Therefore, the cost of the apparatus can be suppressed because the movable unit 55 can be precisely moved without increasing the electromagnetic actuators formed by coils and magnets or adopting electromagnetic actuators of higher output power.

Also, some users may install the projector 1 in a manner such that the projector 1 is significantly inclined to a vertical direction of the screen S. In this case, the influence of the gravity becomes significant when the movable unit is moved in Y1-Y2 direction. In the present embodiment, as described with reference to FIG. 18A and FIG. 18B, the movable unit 55 is moved back-and-forth within ½ distance of the array interval of the micromirrors of the DMD 551 in the X direction and the Y direction, thereby increasing the resolution of the projection image. Therefore, in a case where the projector 1 is installed in a manner such that the projector 1 is significantly inclined to a vertical direction of the screen S, the movable unit 55 cannot precisely move in Y1-Y2 directions due to the influence to the gravity, which may cause a color shift, and the like. Hence, the operation for increasing the resolution by moving the movable unit 55 back-and-forth may be stopped if the projector 1 is installed at an angle of incline greater than or equal to a predetermined angle. When an acceleration sensor is provided, the inclination of the projector 1 can be calculated based on a detection result of the acceleration sensor.

Figure 22:
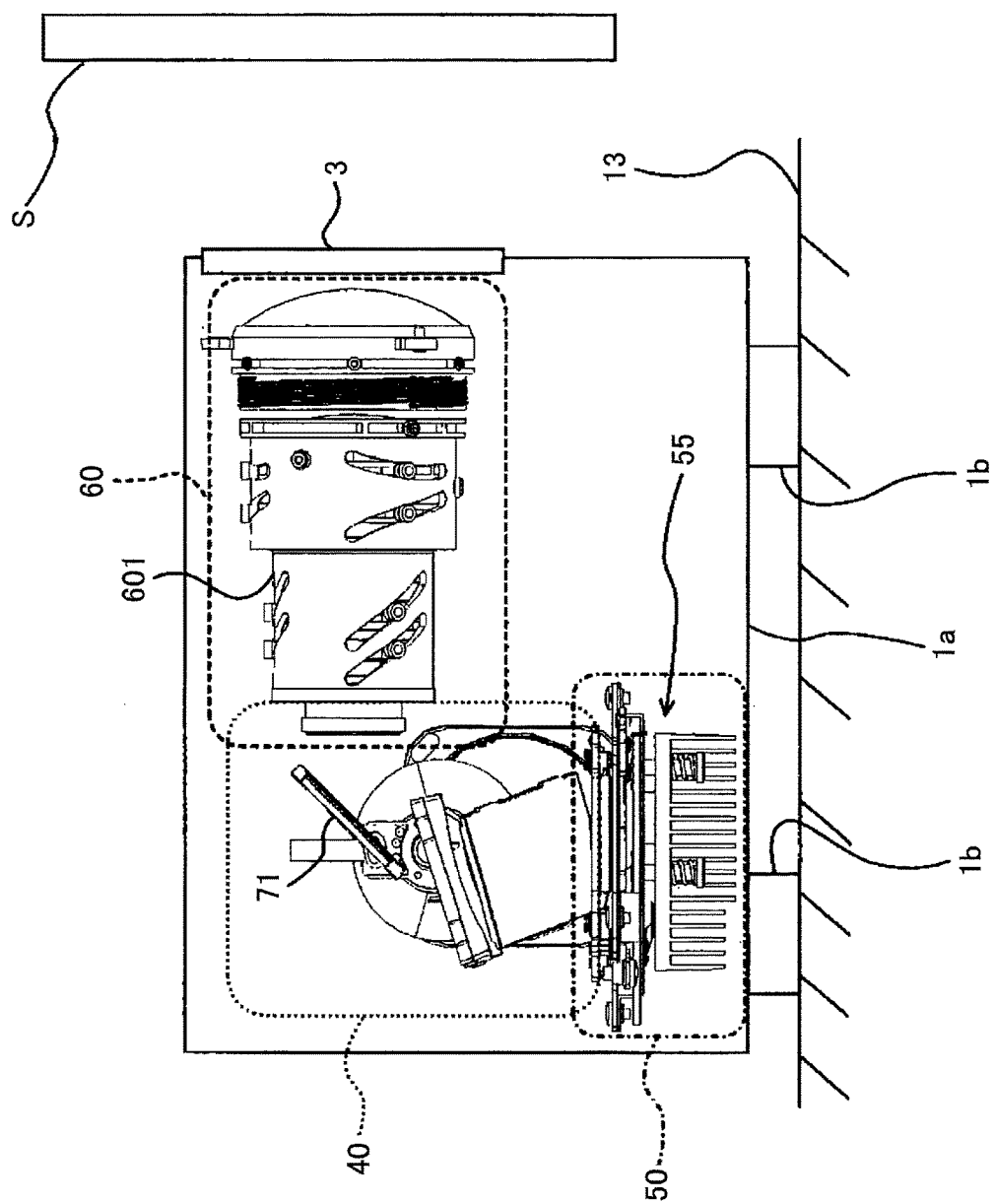
FIG. 22 is a diagram illustrating a variation of the image projection apparatus.
Figure 23:
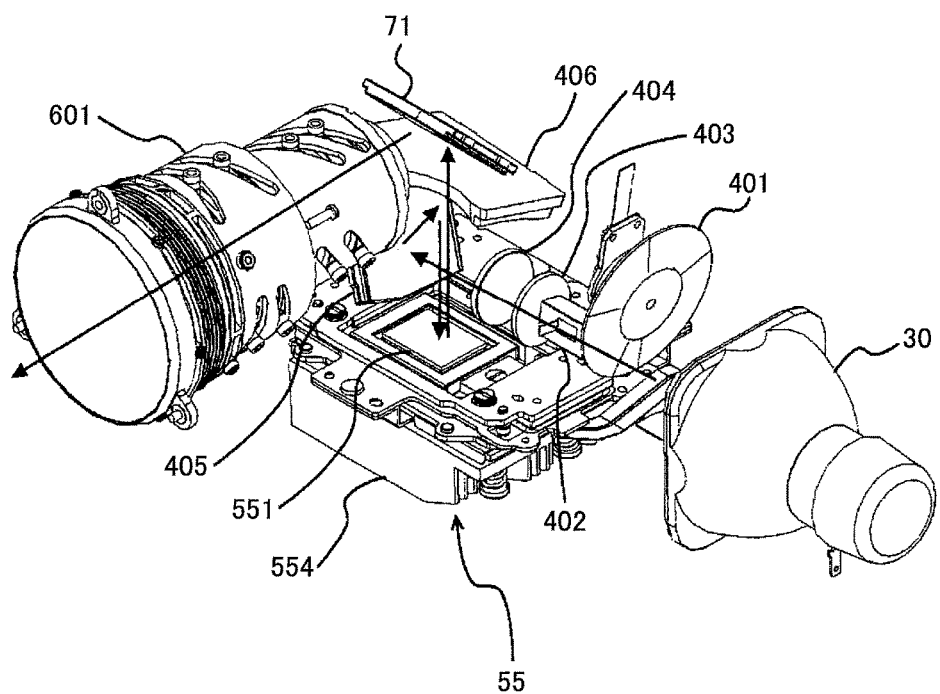
FIG. 23 is a diagram illustrating an optical path of light emitted from a light source in the variation of the image projection apparatus.

In the following, a variation of the projector will be described. FIG. 22 is a diagram illustrating a variation of the projector. FIG. 23 is a diagram illustrating an optical path of a light emitted from a light source in the apparatus of the variation of the projector. As shown in FIG. 22 and FIG. 23, similar to the aforementioned embodiment, the movable unit 55 is disposed to move horizontally in the projector of the present variation. Therefore, the image generation surface of the DMD 551 is disposed facing the top surface of a chassis of the projector, where the top surface faces the installation facing surface 1a. The light forming the image with the DMD 551 is emitted vertically. In the present variation, the light emitted vertically is reflected at a folding mirror 71 to become horizontal, and the horizontal light forming the image passes through the projection lens 601 to be emitted from the radiation window 3 formed on the side surface of the apparatus, thereby projecting the image on the screen S.

In the present variation, similar to the embodiment described above, the lighting optical system unit 40 includes a color wheel 401, a light tunnel 402, relay lenses 403 and 404, a cylinder mirror 405, and a concave mirror 406. The light emitted from the light source 30 is divided into RGB color light beams through the color wheel 401, and the equalization of luminance distribution is performed thereon through light tunnel 402. Then, the light passes through the relay lenses 403 and 404. The light beams are reflected at the cylinder mirror 405 and a concave mirror 406 to irradiate the DMD 551.

The DMD 551 generates the image based on the received light. The light of the generated image is reflected at the folding mirror 71 to become horizontal, and enlarged through the projection lenses 601 to be projected on the screen S.

In the present variation, the movable unit 55 is also disposed inside the apparatus to move horizontally. Specifically, the projector of the present variation also projects the projection image on the screen S that is perpendicular to the horizontal surface. Therefore, except a case of specific projection state, the projector is installed on the installation surface 13 so that the installation facing surface 1a thereof is horizontal by adjusting heights of three or four legs 1b disposed on the installation facing surface 1a. Hence, in the present variation, when the movable unit 55 is disposed to be parallel to the installation facing surface 1a, the moving direction of the movable unit 55 can be horizontal. Thus, in the present variation, the influence of gravity is not significant in moving the movable unit 55. The movable unit 55 can be moved in any directions by the desired amount under the same driving condition. Hence, the movable unit 55 can be controlled to drive with a high precision without too much difficulty, and the resolution of the projection image can be increased through the control without too much difficulty.

Additionally, in the aforementioned configuration, although the movable unit 55 includes the DMD 551 and the heat sink 554, only DMD 551 may be included. In this case, the influence of the gravity becomes less significant. However, still the movable unit 55 cannot be moved with high precision under the same driving condition due to the influence of the gravity if the movable unit 55 is to be moved in the vertical direction. Therefore, even if the movable unit 55 includes only DMD 551, the movable unit 55 is preferably disposed to move horizontally.

The above descriptions are given to provide an example. The following configurations provide respective advantages.

<Configuration 1>

An image projection apparatus such as the projector 1 including an image generation unit for generating an image by using a light emitted from a light source 30, such as the DMD 551, comprises: a movable unit such as the movable unit 55 configured to hold the image generation unit and to be able to change a position of the image generation unit; and a drive unit such as the electromagnetic actuator (formed by magnet and coil) configured to drive the movable unit, wherein the movable unit is disposed to move horizontally.

As described in the embodiment, for example, in a case where movable unit 55 moves back-and-forth vertically, the movable unit 55 is pulled downward by gravity. In contrast, the movable unit 55 moves upward against the gravity. Hence, if a driving condition of fall of the movable unit is set similarly to the driving condition of up of the movable unit, the movable unit may be moved to exceed a specified position when the movable unit falls. Or, the movable unit may not be able to up to the specified position. Therefore, in a case where the movable unit disposed in the apparatus to move back-and-forth vertically, the driving force needs to be reduced or a timing at which a driving direction is switched needs to be set earlier when the movable unit is driven downward. Or, the driving force needs to be increased when the movable unit is driven upward. Thus, the driving condition needs to be complex. In contrast, according to (configuration 1), as described in the embodiment, because the movable unit is disposed to move horizontally, the force of the gravity always acts vertically with respect to the moving direction of the movable unit regardless of the directions in which the movable unit moves. Thus, discrete driving conditions corresponding to the respective moving directions, which are set by considering the discrete influences of gravity, are not required and the same driving conditions can be applied for the respective moving directions. Hence, the movable unit can be controlled to move back-and-force at a predetermined cycle with a high precision without too much difficulty, and the resolution of the projection image can be increased through the control without too much difficulty.

<Configuration 2>

An image projection apparatus such as the projector 1 including an image generation unit for generating an image by using a light emitted from a light source 30 such as the DMD 551 comprises: a movable unit such as the movable unit 55 configured to hold the image generation unit and to be able to change a position of the image generation unit; a drive unit such as the electromagnetic actuator (formed by magnet and coil) configured to drive the movable unit, wherein the movable unit is disposed to move in a direction parallel to an installation facing surface 1a that that faces an installation surface 13 on which the image projection apparatus is installed.

In this configuration, as described in the embodiment, in a normal use, the screen S is disposed perpendicular to a horizontal surface, and the image projection apparatus, such as the projector, is installed in a manner such that the installation facing surface 1a is horizontal in order to project the image on the screen perpendicular to the horizontal surface without inclination. Therefore, in the normal use, the movable unit, such as the movable unit 55, moves horizontally by disposing the movable unit to move in the direction parallel to an installation facing surface 1a. Thus, the force of the gravity always acts vertically with respect to the moving direction of the movable unit regardless of the directions in which the movable unit moves, and the same driving conditions can be applied for the respective moving directions. Hence, the movable unit can be controlled to move back-and-forth at a predetermined cycle with high precision without too much difficulty, and the resolution of the projection image can be increased through the control without too much difficulty.

<Configuration 3>

In addition to <configuration 1> or <configuration 2>, the image projection apparatus further comprises a heat dissipation unit for dissipating heat of the image generation unit such as the heat sink 554, wherein the heat dissipation unit is included in the movable unit such as the movable unit 55.

According to the configuration, the heat of the DMD 551 can be dissipated through the heat dissipation unit such as the heat sink 554 to prevent the DMD 551 being heated to a temperature greater than or equal to a rated temperature, thereby maintaining excellent image quality. Also, adhesion of dust to the DMD 551 caused by air cooling can be prevented. Meanwhile, the influence of the gravity on the movable unit such as movable unit 55 becomes significant since the movable unit includes the heat sink 554. However, in the present configuration, the influence of the gravity does not need to be considered since the movable unit moves horizontally. Therefore, it is advantageous that the movable unit is disposed to move horizontally in the configuration in which the influence of the gravity is significant.

<Configuration 4>

In addition to any one of (configuration 1) to (configuration 3), the image generation unit such as DMD 551 is a digital micromirror device configured to modulate the light received from the light source 30 based on an image signal, in which a plurality of rotatable micromirrors are arrayed, and the image projection apparatus further comprises a movement control unit such as the movement control unit 12 configured to control the drive unit so that the image generation unit is moved by a distance less than the array interval of the micromirrors and an image control unit such as the image control unit 11 configured to generate the image signal corresponding to a position of the image generation unit.

According to the configuration, as described in the embodiments, a projection image whose resolution is higher than a resolution of the image generation unit such as DMD 551 can be projected.

Although the invention has been described above with respect to a specific embodiment for a complete and clear disclosure, the appended claims are not to be thus limited but are to be construed as embodying all modifications and alternative constructions that may occur to one skilled in the art that fairly fall within the basic teaching set forth herein. The present application is based on Japanese Priority Application No. 2015-055297 filed on Mar. 18, 2015, the entire contents of which are hereby incorporated herein by reference.

What is claimed is:

1. An image projection apparatus including an image generation unit for generating an image using light emitted from a light source, the image projection apparatus comprising:
  a movable unit including the image generation unit and being able to change a position of the image generation unit;
  a drive unit configured to drive the movable unit to move; and
  a fixed unit, provided parallel to and directly opposite the movable unit,
  wherein
    the drive unit is formed from a plurality of magnets provided in a bottom surface of the fixed unit, and a plurality of coils provided in the top surface of the moveable unit, the coils being positioned opposite the plurality of magnets, and
    the movable unit is disposed to move the image generation unit horizontally.

2. The image projection apparatus according to claim 1, further comprising
  a heat dissipation unit for dissipating heat of the image generation unit,
  wherein the heat dissipation unit is included in the movable unit.

3. The image projection apparatus according to claim 1, wherein
  the image generation unit is a digital micromirror device configured to modulate the light received from the light source based on an image signal, in which a plurality of rotatable micromirrors are arrayed, and
  the image projection apparatus further comprises a movement control unit configured to control the drive unit so that the image generation unit is moved by a distance less than an array interval of the micromirrors and
  an image control unit configured to generate the image signal corresponding to a position of the image generation unit.

4. The image projection apparatus according to claim 1, wherein the image generation unit moves in a direction orthogonal to the direction of gravity.

5. An image projection apparatus including an image generation unit for generating an image by using light emitted from a light source, the image projection apparatus comprising:
  a movable unit including the image generation unit and being able to change a position of the image generation unit; and
  a drive unit configured to drive the movable unit to move,
  wherein the movable unit is disposed to move the image generation unit in a direction parallel to an installation facing surface, which is a surface that faces an installation surface on which the image projection apparatus is installed.

6. The image projection apparatus according to claim 5, further comprising
  a heat dissipation unit for dissipating heat of the image generation unit,
  wherein the heat dissipation unit is included in the movable unit.

7. The image projection apparatus according to claim 5, wherein the image generation unit is a digital micromirror device configured to modulate the light received from the light source based on an image signal, in which a plurality of rotatable micromirrors are arrayed, and the image projection apparatus further comprises a movement control unit configured to control the drive unit so that the image generation unit is moved by a distance less than an array interval of the micromirrors and an image control unit configured to generate the image signal corresponding to a position of the image generation unit.

8. The image projection apparatus according to claim 5, wherein the image projection apparatus further comprises:

a fixed unit, provided parallel to and directly opposite the movable unit, wherein the drive unit is formed from a plurality of magnets provided in a bottom surface of the fixed unit, and a plurality of coils provided in the top surface of the moveable unit, the coils being positioned opposite the plurality of magnets.

9. An image projection apparatus including a light source, an image generation element for generating an image by using light emitted from the light source, and a heat dissipation unit provided for the image generation element in the chassis of the image projection apparatus, the image projection apparatus comprising:

a movable plate configured to hold at least the heat dissipation unit, and to be able to change a position of the heat dissipation unit; wherein an image generation surface of the image generation element faces a top surface of the chassis, and the heat dissipation unit moves in a direction parallel to the image generation surface.

10. The image projection apparatus according to claim 9, wherein the image projection apparatus further comprises:

a fixed plate, provided parallel to and directly opposite the movable plate, wherein a drive unit that drives the movement of the movable unit is formed from a plurality of magnets provided in a bottom surface of the fixed plate, and a plurality of coils provided in the top surface of the moveable plate, the coils being positioned opposite the plurality of magnets.

* * * * *